(12) United States Patent
Sriramdas et al.

(10) Patent No.: US 12,222,848 B2
(45) Date of Patent: Feb. 11, 2025

(54) TECHNIQUES FOR TEST AUTOMATION PORTALS FOR BEHAVIOR-DRIVEN DEVELOPMENT

(71) Applicant: Wells Fargo Bank, N.A., San Francisco, CA (US)

(72) Inventors: Asha Laxmi Sriramdas, Rancho Santa Margarita, CA (US); Sudeshna Das, Dublin, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 138 days.

(21) Appl. No.: 18/308,228

(22) Filed: Apr. 27, 2023

(65) Prior Publication Data

US 2024/0362153 A1  Oct. 31, 2024

(51) Int. Cl.
*G06F 11/36* (2006.01)
(52) U.S. Cl.
CPC ...... *G06F 11/3684* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 10,261,892 B2 | 4/2019 | Patel et al. | |
| 10,691,584 B2 | 6/2020 | Talukdar et al. | |
| 10,795,669 B2* | 10/2020 | Murala | G06F 8/65 |
| 10,810,110 B1* | 10/2020 | Thomas | G06F 11/3664 |
| 11,086,765 B2 | 8/2021 | Mukherjee | |
| 2005/0204201 A1 | 9/2005 | Meenakshisundaram et al. | |
| 2020/0174917 A1* | 6/2020 | Patel | G06F 8/42 |
| 2020/0379891 A1 | 12/2020 | Canter | |
| 2023/0367693 A1* | 11/2023 | Krupashankar | G06F 11/3688 |

* cited by examiner

*Primary Examiner* — Marina Lee
(74) *Attorney, Agent, or Firm* — K&L Gates LLP

(57) ABSTRACT

Various embodiments are generally directed to techniques for test automation portals for behavior-driven development. Some embodiments are particularly directed to a user interface portal and supporting systems that allow users of various capabilities to view available Behavior-Driven Development (BDD) tests, select one or more BDD tests, execute/schedule automated BDD tests, view execution results, and view execution history from one central location without the need for programming/developer skills.

20 Claims, 15 Drawing Sheets

TECHNIQUES FOR TEST AUTOMATION PORTALS FOR BEHAVIOR-DRIVEN DEVELOPMENT

FIELD OF DISCLOSURE

This disclosure relates generally to test automation technology and more particularly to behavior-driven development test automation portals.

BACKGROUND

In software engineering, behavior-driven development (BDD) typically refers to an agile software development process that encourages collaboration among various technical and non-technical parties in a software project, such as collaboration between developers, quality assurance experts, and customer representatives. BDD encourages teams to use conversation and concrete examples to formalize a shared understanding of how a software application should behave. BDD is a development process that makes use of simple domain-specific languages (DSLs). In some embodiments, these DSLs may be utilized to facilitate converting structured natural language statements into executable tests, resulting in a closer relationship to acceptance criteria for a given function and the tests used to validate that functionality. BDD typically specifies that tests of any unit of software should be specified in terms of the desired behavior of the unit. At the end of BDD, the developed software should be able to adhere to the specified behavior when tested.

Usually, BDD specifies that interested parties should specify behavior in terms of user stories, which are each explicitly written down in a dedicated document. A user story can include a title, a narrative with one or more scenarios, and acceptance criteria for the one or more scenarios. Narratives are typically a short introductory section with the following structure: "as a XXXX, I want YYYY, so that ZZZZ." For example, a narrative may include "as a store owner, I want to add items back to inventory when they are returned, so that I can track inventory." An example scenario for the example narrative may include: "items returned for refund should be added to inventory." Acceptance criteria are typically a description of each specific scenario of the narrative with the following structure: "given XXXX, when YYYY, then ZZZZ" type of format. Continuing with the previous example, acceptance criteria may include "given that I have three black shoes in inventory, when a customer returns a black shoe, then I should have four black shoes in inventory."

BRIEF SUMMARY

Processes, machines, and articles of manufacture for supporting behavior-driven development test automation portals are described. It will be appreciated that the embodiments may be combined in any number of ways without departing from the scope of this disclosure.

Embodiments may include detecting a commit event at a code hosting platform, the commit event corresponding to updates at the code hosting platform associated with behavioral-driven development (BDD) testing of a software application component; retrieving, from the code hosting platform and in response to identification of the commit event, a feature file corresponding to the commit event; parsing the feature file based on a set of onboarded scenarios stored in a database to identify details associated with a set of one or more new or modified scenarios associated with the software application component; updating the set of onboarded scenarios with the details associated with the set of one or more new or modified scenarios to produce an updated set of scenarios; presenting indications of the set of updated scenarios in a scenario dashboard in response to user input accessing the scenario dashboard; identifying a set of selected scenarios for testing in response to user input selecting one or more of the set of updated scenarios for testing; determining, automatically, a corresponding repository and corresponding test information for each scenario in the set of selected scenarios; and utilizing the corresponding repository and corresponding test information for each scenario in the set of selected scenarios to cause an automation server to perform BDD testing on the software application component for the set of selected scenarios.

Other processes, machines, and articles of manufacture are also described hereby, which may be combined in any number of ways, such as with the embodiments of the brief summary, without departing from the scope of this disclosure.

BRIEF DESCRIPTION OF THE DRAWINGS

The present disclosure is illustrated by way of example and not limitation in the figures of the accompanying drawings in which like references indicate similar elements. To easily identify the discussion of any particular element or act, the most significant digit or digits in a reference number refer to the figure number in which that element is first introduced.

DETAILED DESCRIPTION

Figure 1:
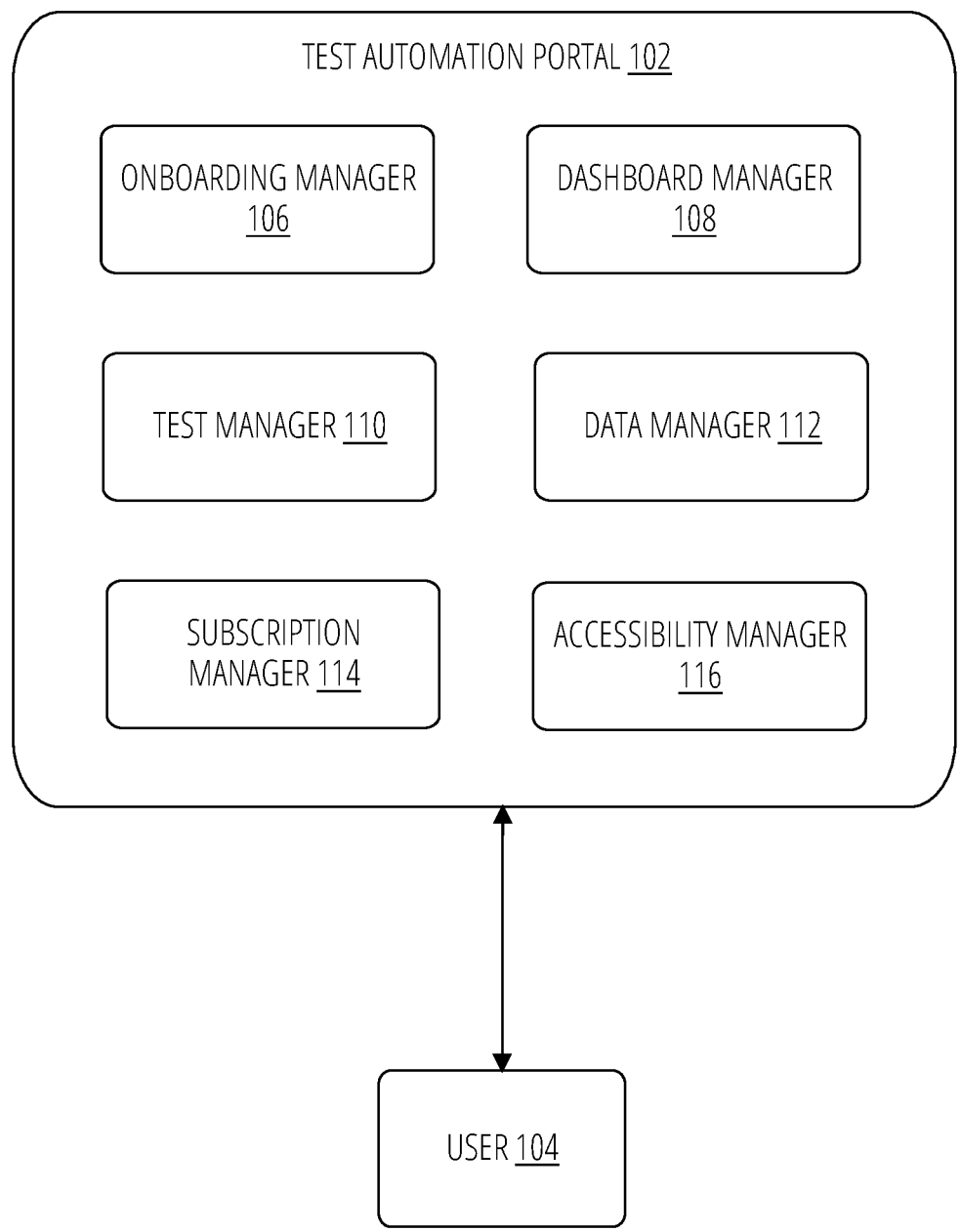
FIG. 1 illustrates an exemplary test automation portal according to one or more embodiments.

Various embodiments are generally directed to techniques for test automation portals for behavior-driven development.

Some embodiments are particularly directed to a user interface portal and supporting systems that allow users of various capabilities to view available Behavior-Driven Development (BDD) tests, select one or more BDD tests, execute/schedule automated BDD tests, view execution results, and view execution history from one central location without the need for programming/developer skills. These and other embodiments are described and claimed.

Many challenges face BDD testing, such as requiring programming/developer skills with respect to a variety of systems. For example, existing systems do not provide a centralized test automation portal to manage BDD tests. This results in users having to go to multiple places and/or rely on developers to be able to access tests, execute tests, and view test results. Requiring developers can lead to excessive delays and inefficiencies, such as due to pulling a developer off a first project to help a non-developer with BDD testing. Adding further complexity, existing systems may rely on users to identify, aggregate, and/or correlate different tests and/or associated data. For example, users may be required to manually identify test scenarios and correlate scenarios with user stories. Such limitations can drastically reduce the usability and applicability of BDD testing systems, contributing to inefficient systems, devices, and techniques with limited capabilities.

Various embodiments described hereby include a test automation portal that enables users of various skill levels (e.g., developer users, quality assurance users, business users, and the like) to onboard, run, and/or review the results of BDD tests and test business functionality for any application. In doing so, the test automation portal may provide a centralized location with all tests and results, improving efficiency and reducing time and resources required for inquiries regarding any specific team or application. In various embodiments, an intuitive and rich interface allows users without coding/engineering background to use the test automation portal. Embodiments of the test automation portal may include a scenario dashboard, an execution dashboard, and a reports dashboard. Additionally, in some embodiments, each of the dashboards may be tailored based on the skill level of the user. In several embodiments, the test automation portal may provide business users with the ability to automatically map user stories to automated tests, pull stories tested for production readiness review, and provide visibility for testing. In addition, developers can be provided with the ability to have one central location for automated testing needs and the capability to provide details to management; meanwhile, management can be provided with the ability to pull reports from the portal without depending on developers or the concerned resources.

The test automation portal provides a scalable solution that can increase the number of users able to manage and execute automated BDD tests. Time spent organizing, executing, and analyzing results for automated tests may be reduced. Further, multiple runs of tests can be executed to identify and reduce defects without slipping into production and users may receive test results by email. The unified test framework of the test automation portal may be used by engineering teams across any line of business in the organization for better tracking and management. For example, execution metadata including details, such as feature, scenario, story, application components, release, continuous response, environment, executed when, who executed, and the like, may be made centrally available via the test automation portal. Additionally, this metadata can be added to continuous integration/continuous deployment such that automatic reports are generated in a centralized location.

In these and other ways, components/techniques described hereby may be utilized to improve BDD testing, resulting in several technical effects and advantages over conventional computer technology, including increased capabilities and improved performance. For example, the test automation portal may enable users of various capabilities to view available BDD tests, select one or more BDD tests, execute/schedule automated BDD tests, view/distribute execution results, and view/distribute execution history from one central location without the need for programming/developer skills. In another example, the test automation portal may provide improved security, such as by removing the need for users to log into and interact with as many independent applications (e.g., one for test execution, another for view test results, etcetera). Additional examples will be apparent from the detailed description below.

In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. For example, a practical application may improve the technical process of one or more of creating, managing, implementing, reviewing, analyzing, and tracking BDD tests, such as by automatically aggregate test scenarios and associating test scenarios with user stories. In another example, the test automation portal may automatically adapt to the level of skill corresponding to the user. In yet another example, the test automation portal may interact with, direct, and/or manage other computing components, such as an event streaming service, a code hosting platform, and an automation server. For instance, the test automation portal may arrange a BDD test and communicate instructions to an automation server to cause the automation server to perform a set of BDD tests on a system under test (e.g., a software development project or one or more components thereof). Additional examples will be apparent from the detailed description below. Further, one or more of the aspects, techniques, and/or components described hereby may be utilized to improve the technical fields of software development project management, behavior driven development testing, and/or automated software testing.

In several embodiments, components described hereby may provide specific and particular manners to enable improved BDD testing. In many embodiments, one or more of the components described hereby may be implemented as a set of rules that improve computer-related technology by allowing a function not previously performable by a computer that enables an improved technological result to be achieved. For example, the function allowed may include one or more of the specific and particular techniques disclosed hereby such as tracking and distributing BDD test results over the lifetime of a software development project. In another example, the function allowed may include enabling, and customizing for, users of different skill sets to create, manage, implement, review, analyze, and track BDD tests. Additional examples will be apparent from the detailed description below.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter. Aspects of the disclosed embodiments may be described with reference to one or more of the following figures. Some of the figures may include a logic flow and/or a process flow. Although such figures presented herein may include a particular logic or process flow, it can be appreciated that the logic or process flow merely provides an example of how the general functionality as described herein can be implemented. Further, a given logic or process flow does not necessarily have to be executed in the order presented unless otherwise indicated. Moreover, not all acts illustrated in a logic or process flow may be required in some embodiments. In addition, a given logic or process flow may be implemented by a hardware element, a software element executed by a processor, or any combination thereof.

FIG. 1 illustrates a test automation portal 102 according to some embodiments. Generally, the test automation portal 102 may operate to integrate various aspects of testing for behavioral driven development into a centralized platform for all types of users. A user 104 may interact with the test automation portal 102 to manage, implement, and/or view the various aspects of testing for behavioral driven development. In the illustrated embodiment, the test automation portal 102 includes an onboarding manager 106, a dashboard manager 108, a test manager 110, a data manager 112, a subscription manager 114, and an accessibility manager 116. It will be appreciated that one or more components of FIG. 1 may be the same or similar to one or more other components disclosed hereby. Embodiments are not limited in this context.

The test automation portal 102 may enable users (e.g., user 104) to view available BDD tests, select one or more BDD tests, execute or schedule the automated BDD tests, and view the execution results as well as execution history from one central location. In various embodiments, the test automation portal 102 may comprise one or more of web portal, a mobile application, and a desktop application for various users in BDD teams to execute automated tests on demand. In various such embodiments, the automated tests may be executed on demand in a cloud. Accordingly, one or more components of the test automation portal 102 may be located in a public or private cloud. Further, the test automation portal 102 in the public or private cloud may be accessible via a web portal. In several embodiments, users (e.g., user 104) may check results of the automated tests. In several such embodiments, the results may be checked in real-time.

In various embodiments, the components of the test automation portal 102 may interoperate to enable the test automation portal 102 to provide numerous benefits and capabilities to BDD and the processes and procedures associated with enterprise BDD projects. For example, the test automation portal 102 may provide the ability to select a specific scenario to test for a given user story or application. The test automation portal 102 may provide the capability to get information regarding test execution and test execution metadata, such as environment, release, stories, and the like. The test automation portal 102 may generate and/or distribute reports (e.g., via email). Additionally, the reports may include insights, such as test trends over time. The test automation portal 102 may be easier for users without any engineering knowledge. The test automation portal 102 may condense the delivery of a story, leading to faster delivery by testing quickly and often. The test automation portal 102 may reduce human errors, save resources, and improve quality in reporting and tracking BDD projects.

A brief overview of each of the illustrated components of the test automation portal 102 will now be described. However, additional details are provided below, such as with respect to the description of FIGS. 2-12. In various embodiments, one or more components of test automation portal 102 may communicate with external components (e.g., a third party database) using application programming interfaces (APIs). In some embodiments, two or more components of test automation portal 102 may communicate with each other using APIs.

The onboarding manager 106 may facilitate and guide users through onboarding of new BDD tests into the test automation portal 102. The dashboard manager 108 may provide various dashboards to users. The test manager 110 may control aspects of conducting BDD tests. The data manager 112 may format, generate, update, and store data associated with BDD testing. In many embodiments, the data manager 112 may generate and maintain data structures for tracking various aspects of the BDD process. In some embodiments, the data manager 112 may include a database. In other embodiments, the data manager 112 may be communicatively coupled to a database, such as a third-party database. In either embodiment, the data manager 112 may act as a gateway or administrator for the database. In several embodiments, other components of the test automation portal 102 may pass data to the data manager 112 for storing data and/or pass requests to the data manager 112 for retrieving data.

The subscription manager 114 may subscribe to and listen for events published to an event streaming service. For example, the subscription manager 114 listen for events published to the event streaming service by a code hosting platform and/or an automation server. In some embodiments, the subscription manager 114 may publish events to the event streaming service. In many embodiments, the subscription manager 114 may trigger operations of one or more other components in the test automation portal 102 in response to detecting the publication of various events. For example, subscription manager 114 may trigger generation of a report in response to detecting publication of test execution events by an automation server.

Figure 2:
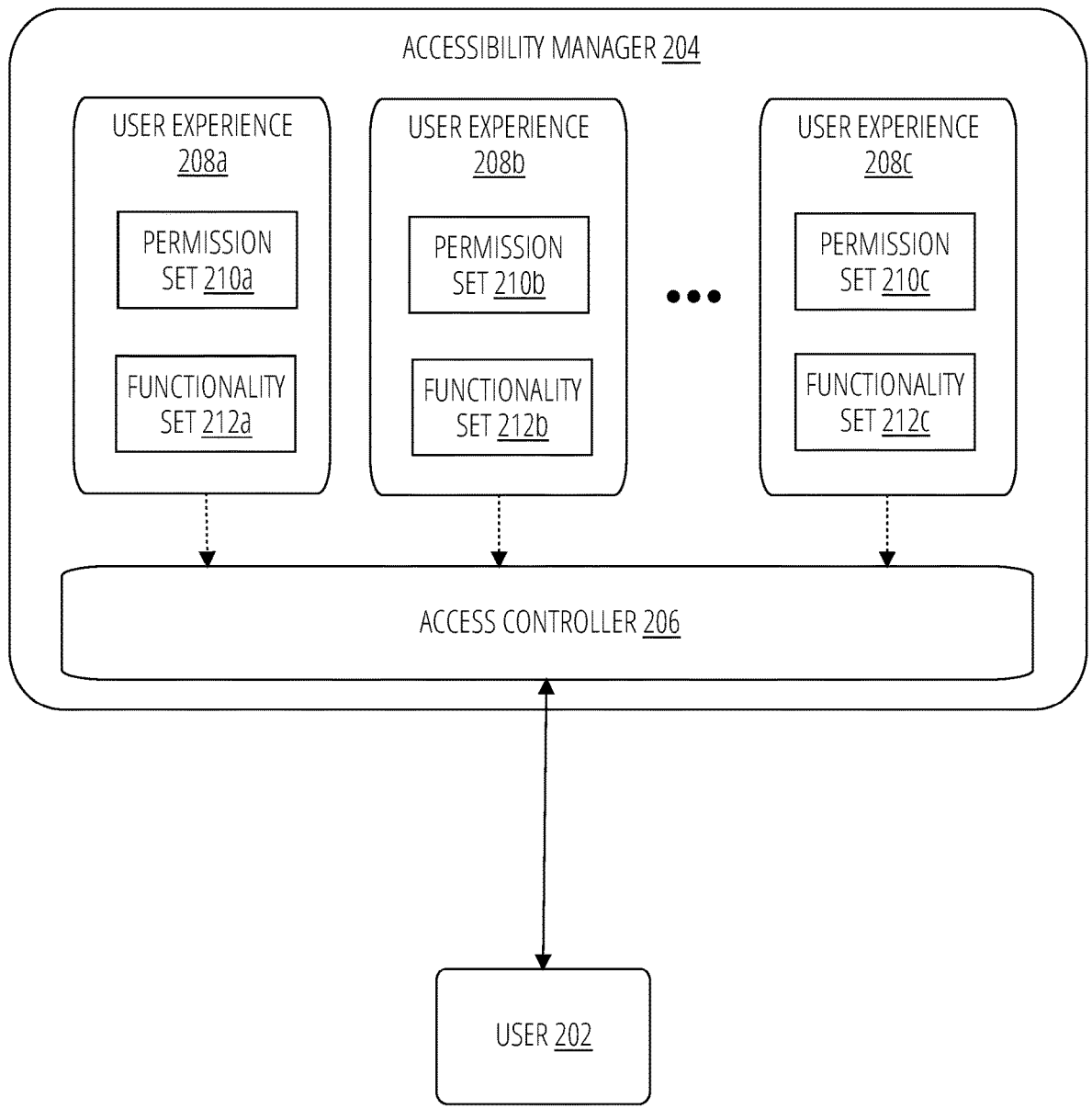
FIG. 2 illustrates exemplary aspects of an accessibility manager according to one or more embodiments.

FIG. 2 illustrates exemplary aspects of an accessibility manager 204 according to some embodiments. Generally, the accessibility manager 204 may provide a user 202 with a certain user experience based on the type of the user 202 (e.g., developer, business user, management, etcetera). Each of the one or more user experiences 208a, 208b, 208c (collectively referred to as user experiences 208) may include a certain collection of permissions and functionalities when interacting with a test automation portal. In the illustrated embodiment, the accessibility manager 204 includes an access controller 206, a first user experience 208a (e.g., a business user experience) with permission set 210a and functionality set 212a, a second user experience 208b (e.g., a developer user experience) with permission set 210b and functionality set 212b, and a third user experience 208c (e.g., a manager user experience) with permission set 210c and functionality set 212c. In many embodiments, the access controller 206 may provide one or more of the user experiences to user 202, such as based on login credentials provided by the user 202. It will be appreciated that one or more components of FIG. 2 may be the same or similar to one or more other components disclosed hereby. For example, accessibility manager 204 may be the same or similar to accessibility manager 116. Embodiments are not limited in this context.

In various embodiments, the accessibility manager 204 may provide one or more user experiences to users based on the capabilities of the user. Accordingly, accessibility manager 204 may be configured to provide a user with a set of permissions and a set of functionalities that allow that user to maximize their abilities without being inundated with excess, irrelevant, or dangerous capabilities and/or information. For example, if a user does not understand coding, then coding interfaces would not be accessible through their user experience. In another example, debug information may only be presented to developer users. In yet another example, a business user may not be provided with the ability (intentionally or accidentally) to make changes with far reaching consequences (e.g., edit code files). In other words, user experiences may be configured to protect users from themselves by preventing them from making changes they do not understand the consequences of. Any number and/or combination of user experiences 208 may be utilized in a test automation portal. In some embodiments, certain modules of the test automation portal may only be available through certain user experiences. For example, onboarding manager 106 may only be available to developer users.

In operation, access controller 206 may provide one of the user experiences 208 to user 202 based on credentials provided by the user 202 (e.g., login credentials). Accordingly, each set of login credentials may be associated with a particular user experience. The association between login credentials and user experience may be determined based on the experience level and/or capabilities of a user or information typically indicative of experience level and/or capabilities. For example, the access controller 206 may determine the user experience for a user based on an employee profile (e.g., indicating the line of business or a title that the user holds at a company). In some embodiments, the user experience for a user may be manually selected or altered. For example, developer users and management users may have appropriate permissions to add/remove users and change user experiences. However, business users may not have appropriate permissions to add/remove users and change user experiences. Three exemplary user experiences are described below with respect to the illustrated embodiment.

The first user experience 208*a* may correspond to business users. In several embodiments, the first user experience 208*a* may provide business users with an efficient and intuitive way to perform tasks associated with BDD. For example, business users may be able to map user stories (e.g., a Jira story) to automated tests. In another example, business users may have the ability to pull (e.g., generate/distribute reports) user stories tested for production readiness review. In yet another example, business users may have visibility regarding testing (e.g., test schedule, test status, test results, and the like), such as for application lifecycle management.

The second user experience 208*b* may correspond to developer users. In several embodiments, the second user experience 208*a* may provide developer users with an efficient and intuitive way to perform tasks associated with BDD. For example, developers may be provided with one central location for automated testing needs. In another example, developers may be provided with the capability to provide appropriate details to management in an automated or semi-automated manner. In such other examples, developers may be provided with automated reporting functionalities.

The third user experience 208*b* may correspond to manager users. In several embodiments, the second user experience 208*a* may provide manager users with an efficient and intuitive way to perform tasks associated with BDD. For example, manager users may be provided with the ability to pull reports (e.g., status reports) from the test automation portal without having to request them from developers or business users. In at least this way, the test automation portal can improve managerial efficiency and improve status monitoring in an unobtrusive manner.

In many embodiments, some generally functionalities may be provided to a plurality of user experiences, but in a manner that tailors the functionalities based on corresponding user experience. For example, the system may provide automated reporting functionality to all user experiences. However, the contents of the reports generated (or options for generating the report) by a developer may be more detailed, such as by including fault codes, execution times, and the like, than reports generated by a business user. In many embodiments, reports may be generated by a first user for communication to a second user, such as for reporting to management. In many such embodiments, the system may generate the report based on the target recipient. For example, if a business user generates a report for sending to a developer user, then the report may include additional detail when compared to a report generated for sending to another business user. In another example, a report generated for a manager user may include various big picture tracking details that would not be included in a report generated for a business user. For example, the tracking details may indicate where the report fits in with respect to the overall project and production readiness review.

Figure 3:
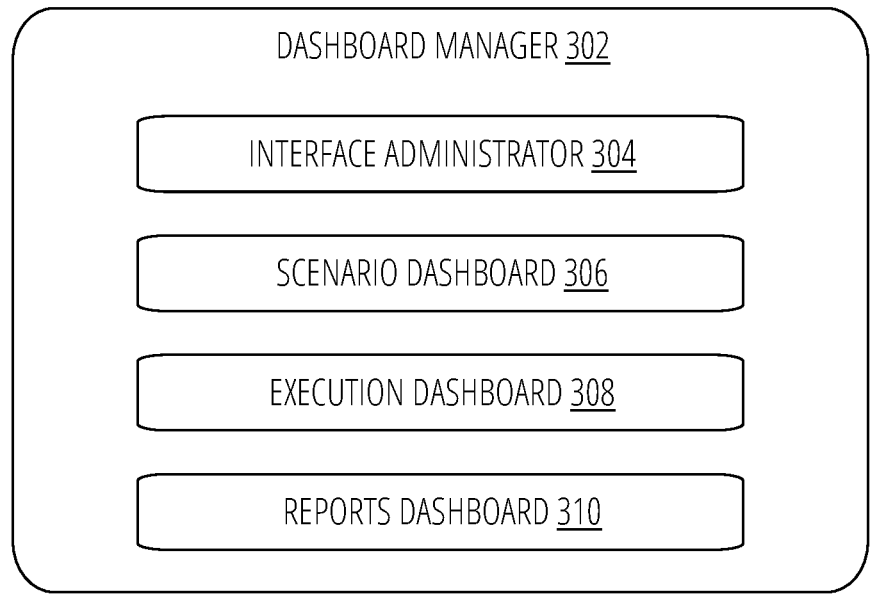
FIG. 3 illustrates exemplary aspects of a dashboard manager according to one or more embodiments.

FIG. 3 illustrates exemplary aspects of a dashboard manager 302 according to some embodiments. Generally, the dashboard manager 302 may provide user interface functionality, such as producing user interfaces, receiving input, generating output, and/or invoke operations based on the received input and/or generated output. In many embodiments, the user interface functionality may occur via one or more dashboard interfaces. In the illustrated embodiment, the dashboard manager 302 includes an interface administrator 304, a scenario dashboard 306 (see e.g., FIGS. 10A and 10B), an execution dashboard 308 (see e.g., FIG. 11), and a reports dashboard 310 (see e.g., FIG. 12). It will be appreciated that one or more components of FIG. 3 may be the same or similar to one or more other components disclosed hereby. For example, dashboard manager 302 may be the same or similar to dashboard manager 108. Embodiments are not limited in this context.

The dashboard manager 302 may provide the user interface functionality to a user based, at least in part, on the user experience associated with the user. For example, interface administrator 304 may generate a first version of scenario dashboard 306 for a developer user based on the permission set and functionality set from the user experience associated with the developer user. The dashboard manager 302 operates to provide an improved user interface for electronic devices at least through the specific manners of providing (e.g., by displaying) the customized and intuitive experience to a user described hereby. For example, the scenario dashboard 306 may provide a specific improvement over existing systems by automatically aggregating available test scenarios, displaying the test scenarios in a manner that allows selection and execution of one or more test scenarios, and displaying the available test scenarios in association with corresponding user stories. One or more tests may be associated with each test scenario. In another example, the execution dashboard 308 may provide a specific improvement over existing systems by providing test execution progress and/or results in real-time for historical and in-process BDD tests. In yet another example, the reports dashboard 310 may provide a specific improvement over existing systems by providing testing overview of BDD software development projects, such as successful or failed tests over time and/or releases.

In at least one embodiment, the interface administrator 304 may organize icons/functions based on user usage. For example, the interface administrator 304 may track the amount of user of each icon/function over a predetermined period of time and automatically move the most used icons/functions to a position in the dashboard that is conveniently accessible by a user, such as by positioning them in a quick access bar (e.g., by moving them from a drop down menu).

Figure 4:
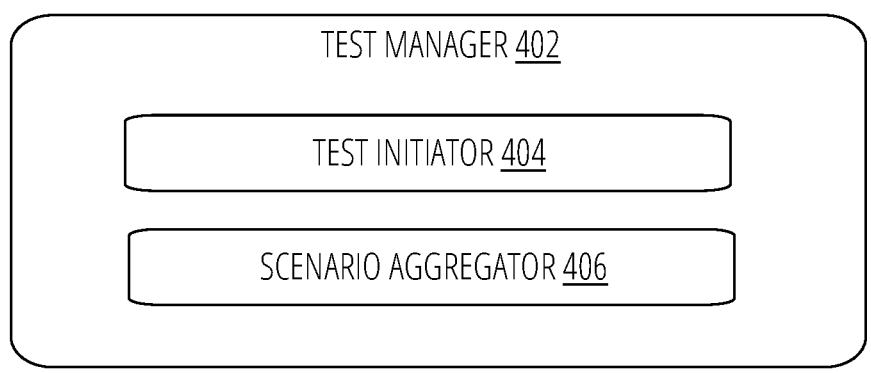
FIG. 4 illustrates exemplary aspects of a test manager according to one or more embodiments.

FIG. 4 illustrates exemplary aspects of a test manager 402 according to some embodiments. Generally, the test manager 402 may manage test related data and initiate testing. In the illustrated embodiment, test manager 402 includes a test initiator 404 and a scenario aggregator 406. It will be appreciated that one or more components of FIG. 4 may be the same or similar to one or more other components disclosed hereby. For example, test initiator 404 may be the same or similar to test manager 110. Embodiments are not limited in this context.

In some embodiments, the scenario aggregator 406 may read feature files and aggregate scenarios. In various embodiments, the test initiator 404 may trigger test execution at an automation server, such as by passing the appropriate parameters to the automation server to cause the automation server to carry out a BDD test. In many embodiments, the test initiator 404 may generate an execution record and pass the execution record to the data manager for storage. In various embodiments, the execution record may include a data structure for tracking test performance and results. Accordingly, in some embodiments, the execution record may be updated with execution data and/or execution metadata during and after execution of the test(s). For example, the execution record may be updated with results after performance of the test.

Figure 5:
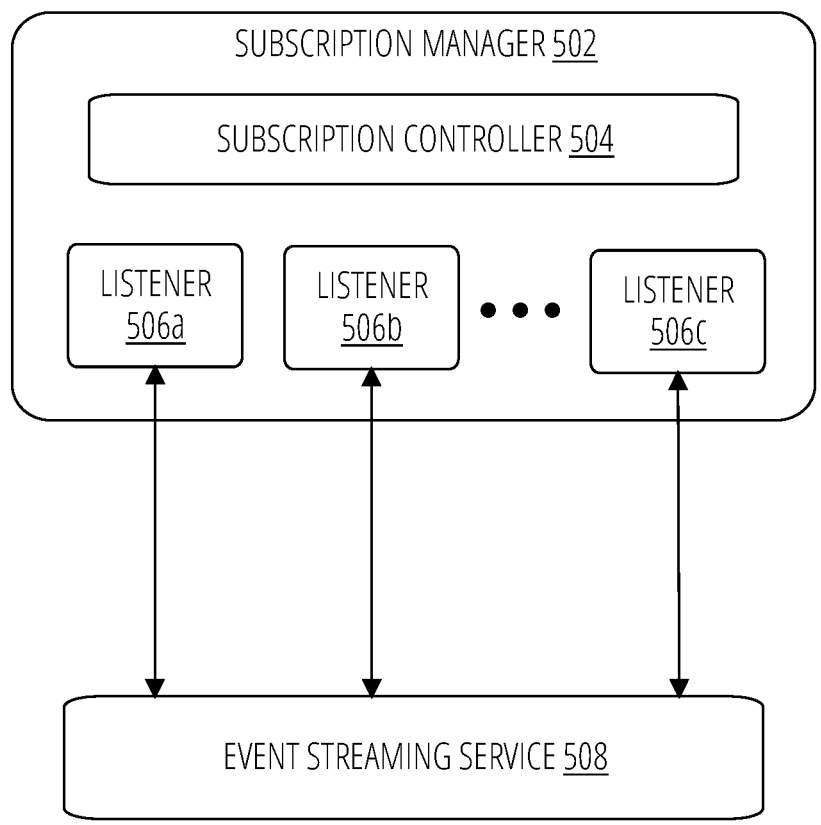
FIG. 5 illustrates exemplary aspects of a subscription manager according to one or more embodiments.

FIG. 5 illustrates exemplary aspects of a subscription manager 502 according to some embodiments. Generally, the subscription manager 502 may subscribe to topics of an event streaming service 508 and listen for events associated with the subscribed topics. In the illustrated embodiment, subscription manager 502 includes a subscription controller 504 and one or more listeners 506a, 506b, 506c (collectively referred to as listeners 506). In one embodiment, the subscription manager 502 may publish events to the event streaming service 508. In one such embodiment, the subscription manager 502 may publish reports or report generation events to the event streaming service 508. It will be appreciated that one or more components of FIG. 5 may be the same or similar to one or more other components disclosed hereby. For example, subscription manager 502 may be the same or similar to subscription manager 114. Embodiments are not limited in this context.

Figure 6:
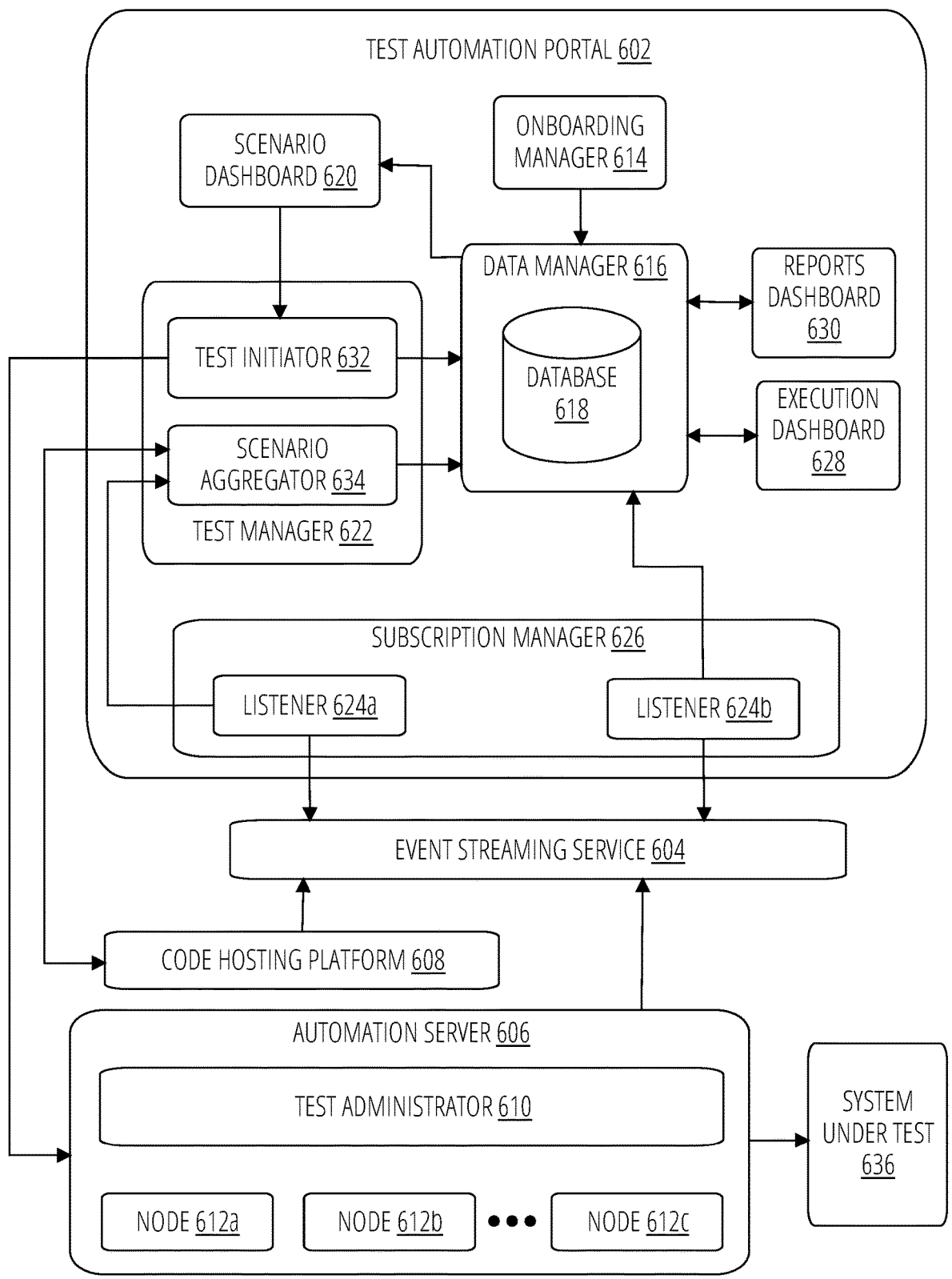
FIG. 6 illustrates exemplary aspects of a test automation portal according to one or more embodiments.

FIG. 6 illustrates exemplary aspects of a test automation portal 602 according to some embodiments. The test automation portal 602 may operate to integrate various aspects of testing for behavioral driven development into a centralized platform. In the illustrated embodiment, a high-level architecture with exemplary interactions within and/or between the test automation portal 602, an event streaming service 604, an automation server 606, a code hosting platform 608, and a system under test 636 are shown. The test automation portal 602 may include an onboarding manager 614, a data manager 616 with a database 618, a scenario dashboard 620, a test manager 622 with a test initiator 632 and a scenario aggregator 634, a subscription manager 626 with listeners 624a, 624b, an execution dashboard 628, and a reports dashboard 630. The automation server 606 may include a test administrator 610 and one or more nodes 612a, 612b, 612c (collectively referred to as nodes 612). In some embodiments, one or more of the automation server 606 and the code hosting platform 608 may be integrated into the test automation portal 602. It will be appreciated that one or more components of FIG. 6 may be the same or similar to one or more other components disclosed hereby. For example, onboarding manager 614 may be the same or similar to onboarding manager 106. In another example, scenario dashboard 620 may be the same or similar to scenario dashboard 306. Embodiments are not limited in this context.

Initially, the onboarding manager 614 may assist a user (e.g., a developer user) with onboarding of a test to the test automation portal 602. As part of the onboarding process, the onboarding manager 614 may collect information that enables the test automation portal 602 to index, manage, and/or trigger execution of the test. For example, the onboarding manager 614 may collect one or more of an application identifier, a component name (e.g., component of the application to which the test is associated), whether it is an automation project, and the test script directory and/or feature file location (e.g., the uniform resource locator (URL) on the code hosting platform 608). The information collected by the onboarding manager 614 may be passed to the data manager 616 for storage in the database 618.

In various embodiments, the code hosting platform 608 may maintain one or more automation repositories for testing scripts, feature files, and the like corresponding to the test scenarios. In some embodiments, the test automation portal 602 may cause the code hosting platform 608 to generate an automation repository, or update an existing one, as part of the onboarding process. In other embodiments, a user, such as a developer may upload the contents of the automation repository.

The code hosting platform 608 may publish events to the event streaming service 604 corresponding to commits of test scenario data/code (e.g., feature files, scripts, etcetera) to automation repositories at the code hosting platform 608. The listener 624a of the subscription manager 626 may listen for such events published by the code hosting platform 608 to the event streaming service 604 and, in response, cause the scenario aggregator 634 to retrieve the added/modified data (e.g., new or updated scenarios) and cause the database 618 to be updated based thereon. In some embodiments, the scenario aggregator 634 may generate scenario metadata for storage in the database 618 in response to events published by the code hosting platform 608 to the event streaming service 604. For example, scenario aggregator 634 may cause a history of changes to automation repositories to be created in database 618. In many embodiments, the scenario aggregator 634 may maintain a set of onboarded scenarios in the database 618. In many such embodiments, the added/modified data may be utilized to update the set of onboarded scenarios.

In many embodiments, the scenario aggregator 634 may retrieve the added/modified data (e.g., new or updated scenarios) by reading read feature files on the code hosting platform 608. In various embodiments, the listener 624a may be subscribed to the appropriate topic of the event streaming service 604, such as during the onboarding process. In several embodiments, the appropriate topic may correspond to the automation repository to which test scenario data/code (e.g., feature files, scripts, etcetera) are stored. Additionally, in some embodiments, the listener 624*b* may be subscribed to the appropriate topic of the automation server 606, such as during onboarding, for monitoring execution status and results.

The remainder of the description related to FIG. 6 is primarily directed to exemplary aspects of executing, and the results of executing, the onboarded test (potentially along with one or more other tests that were previously onboarded into the test automation portal 602). A user may log in to the test automation portal 602 and be brought to the scenario dashboard 620. The scenario dashboard 620 may be populated, such as by interface administrator 304, with the various scenarios that are available for testing based on data provided by the data manager 616 from database 618 (see e.g., FIG. 10A). The user may select the scenario(s) to test and click to trigger execution via the scenario dashboard 620. In response to triggering execution, the test initiator 632 of test manager 622 may pass the relevant information to the automation server 606 to cause execution of the tests of the selected scenarios. For example, the appropriate URL of the code hosting platform 608 (e.g., the URL of the automation repository), the scenario identifiers, tags, etcetera may be passed to the automation server 910. Additionally, the test initiator 632 may generate execution metadata for storage in database 618. For example, execution metadata may include one or more of an execution record, feature, scenario, story, application components, release, continuous response, environment, executed when, who executed, and the like.

Figure 11:
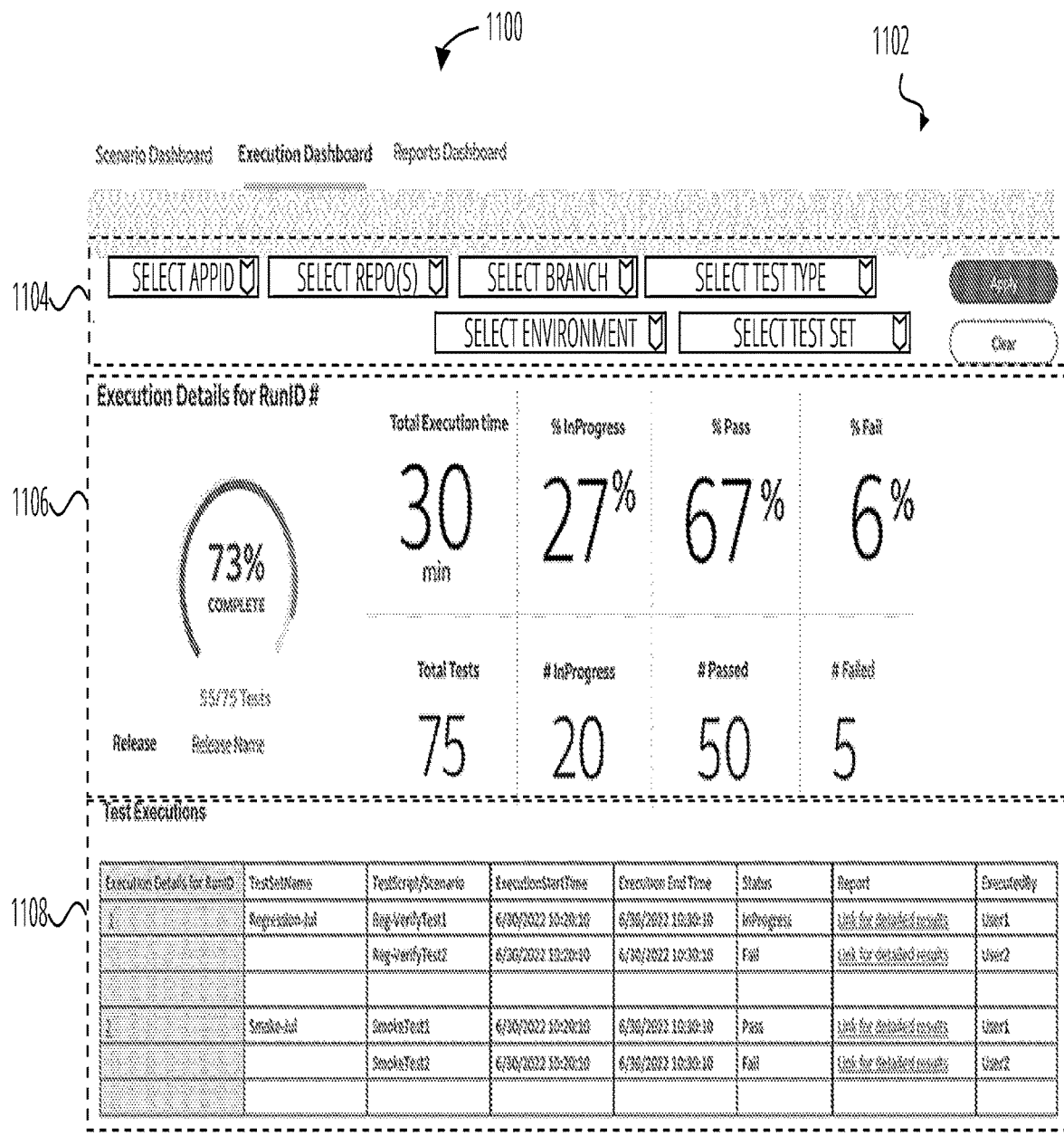
FIG. 11 illustrates an exemplary aspects of an execution dashboard according to one or more embodiments.

Once the execution starts, the user may be directed to the execution dashboard 628 to monitor the execution status (see e.g., FIG. 11). The actual execution may occur at the automation server 606 via the test administrator 610 and the one or more nodes 612. During execution of the test, the one or more nodes 612 may interact with the system under test 636 to perform the test on the selected scenario(s). Additionally, the automation server 606 will publish execution events to the event streaming service 604 that will be detected by listener 624*b* and used to enable the user to monitor the execution status and results.

The listener 624*b* may cause the test automation portal 602 (e.g., via data manager 616 and/or test manager 622) to obtain, format, generate, and/or store corresponding execution data and execution metadata in response to the events published to the event streaming service 604. For example, a history of test scenario executions and events may be created in database 618 based, at least in part, on events detected by listener 624*b*. In various embodiments, one or more portions of the updated execution data and/or execution metadata in database 618 may be presented via the execution dashboard 628 to enable a user to monitor the execution status. As part of execution, the automation server 606, or components thereof, may perform one or more of check out one or more automation repositories at the code hosting platform 608, execute tests, and pass environment/application URL as a system variable.

The reports dashboard 630 may be used to view historical events and execution results. In various embodiments, a user may access one or more of execution records, execution data, execution metadata, feature files, and changes to automation repositories. In some embodiments, a user may view trends over multiple executions and/or multiple scenarios via the reports dashboard 630 (see e.g., FIG. 12). For example, the test automation portal 602 may generate analytics using data in database 618. In many embodiments, the test automation portal 602 may be utilized to re-execute failed scenario or test set again instead of having to reconstruct the test via the scenario dashboard 620. In various embodiments, reporting schemes may be created via the reports dashboard 630. For example, reporting requirements for various scenarios, tests, and/or events may be automatically performed based on the reporting schemes. In some such examples, reporting schemes may be assigned to various scenarios, tests, and/or events.

In some embodiments, test data maintenance may be integrated into the test automation portal 602. For example, a user may be able to view, edit, and maintain automation repositories via the test automation portal 602. In many embodiments, performance tests, in addition to scenario tests, may be executed via the test automation portal 602. In several embodiments, the test automation portal 602 may provide the ability to build a scenario or a test via the test automation portal 602. In several such embodiments, existing scenarios and/or tests (e.g., onboarded scenarios and/or tests) may be utilized to build new scenarios and/or tests. For example, existing scenarios and/or tests may be used as a template or starting point. In another example, multiple scenarios and/or tests may be combined. In various embodiments, tests can be scheduled for specific dates and times, such as on a periodic basis.

Figure 7:
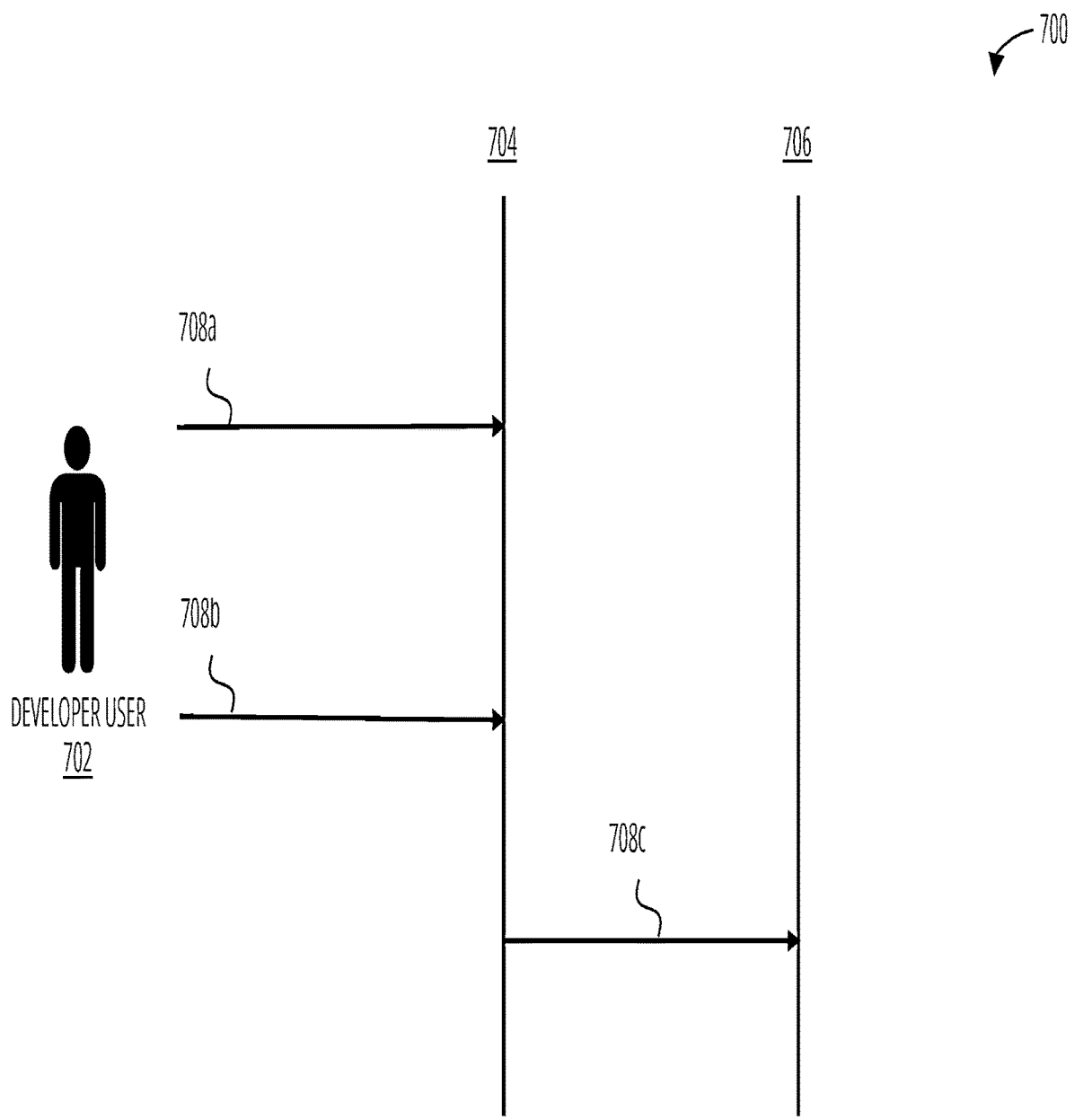
FIG. 7 illustrates an exemplary process diagram corresponding to onboarding according to one or more embodiments.

FIG. 7 illustrates a process diagram 700 corresponding to onboarding according to some embodiments. More specifically, process diagram 700 may correspond to onboarding a BDD test automation project into a test automation portal. Many of the operations of process diagram 700, such as those without direct interaction with developer user 702, are automatically performed by the test automation portal. The process diagram 700 may include various processes involving one or more of a developer user 702, an onboarding manager 704, and a data manager 706. It will be appreciated that one or more components of FIG. 7 may be the same or similar to one or more other components disclosed hereby. For example, onboarding manager 704 may be the same or similar to onboarding manager 106 or onboarding manager 614. In another example, data manager 706 may be the same or similar to data manager 616. Embodiments are not limited in this context.

At process 708*a*, the developer user 702 may navigate to the onboarding screen at onboarding manager 704. At process 708*b*, the developer user 702 may provide the component (e.g., test scenario) details to onboarding manager 704. For example, the component details may include one or more of an application identifier, a component name (e.g., component of the application to which the test is associated), whether it is an automation project, and the test script directory and/or feature file location (e.g., the uniform resource locator of the automation repository on the code hosting platform 608). At process 708*c*, the component details may be stored by the data manager 706, such as in database 618.

Figure 8A:
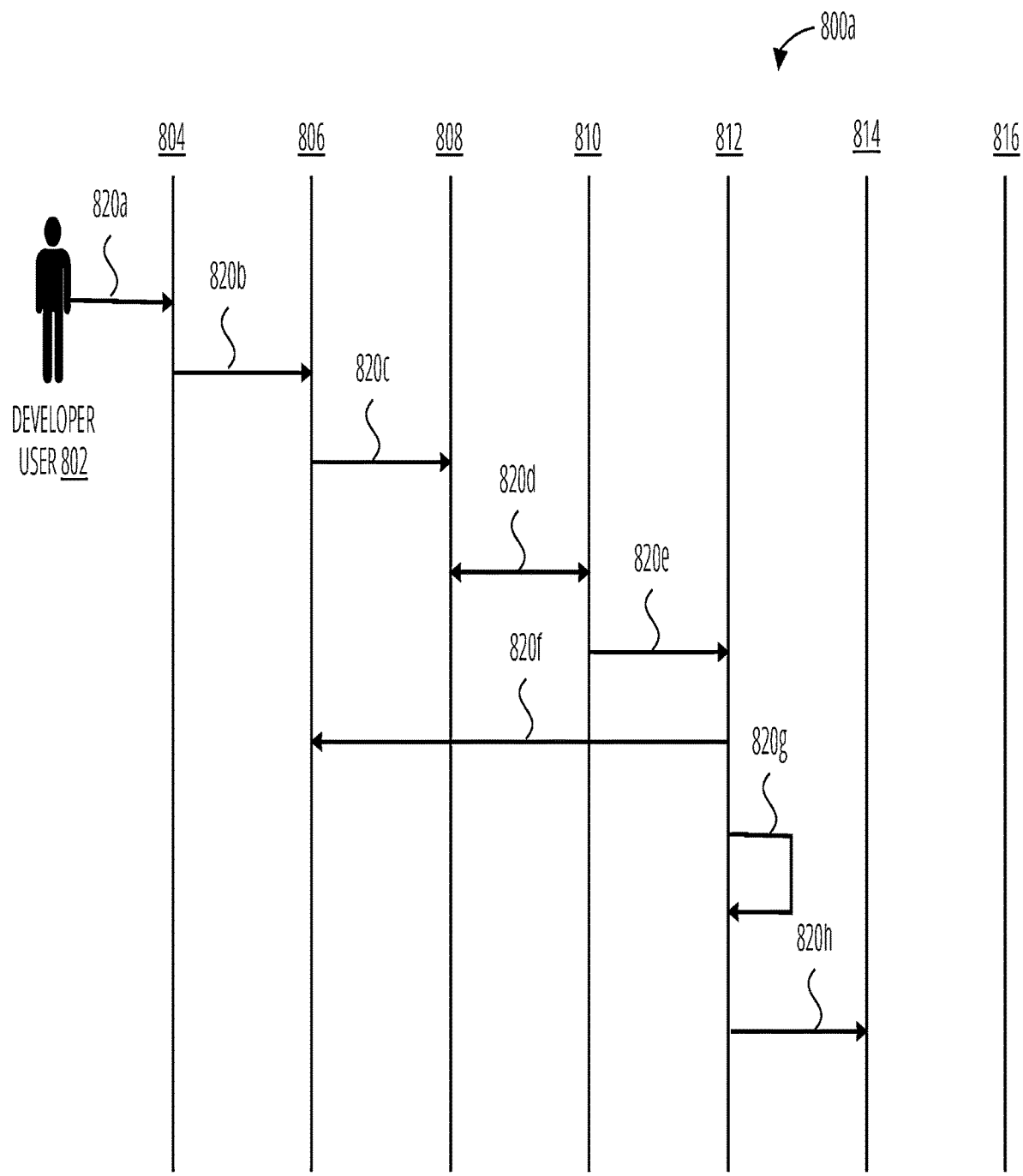
FIGS. 8A and 8B illustrate exemplary process diagrams corresponding to test scenarios according to one or more embodiments.
Figure 8B:
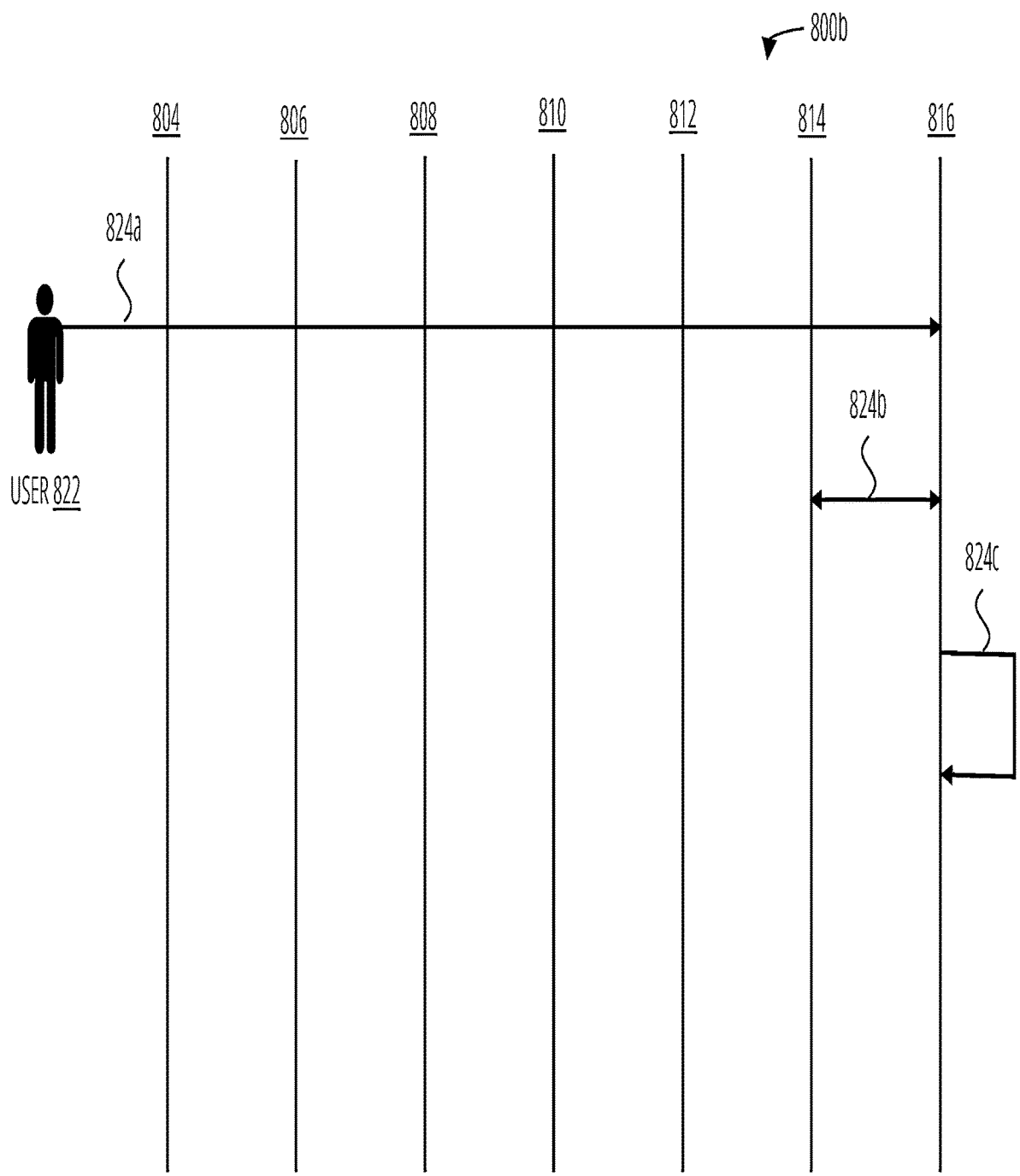

FIGS. 8A and 8B illustrates process diagrams 800*a*, 800*b* corresponding to test scenarios according to some embodiments. More specifically, process diagram 800*a* may correspond to developer user 802 interactions associated with test scenarios in a test automation portal and process diagram 800*b* may correspond to user 822 (e.g., developer or non-developer) interactions associated with test scenarios in the test automation portal. Many of the operations of process diagrams 800*a*, 800*b*, such as those without direct interaction with developer user 802 or user 822, are automatically performed by the test automation portal. The process diagrams 800*a*, 800*b* may include various processes involving one or more of a scenario dashboard 804, code hosting platform 806, event streaming service 808, subscription manager 810, test manager 812, data manager 814, scenario dashboard 816, the developer user 802, and the user 822. It will be appreciated that one or more components of FIGS. 8A and 8B may be the same or similar to one or more other components disclosed hereby. For example, test manager 812 may be the same or similar to test manager 402 or test manager 622. In another example, scenario dashboard 804 may be the same or similar to scenario dashboard 816. In at least one such example, scenario dashboard 804 may correspond to a scenario dashboard for a developer (e.g., in functionality set 212a) and scenario dashboard 816 may correspond to a scenario dashboard to a business user (e.g., in functionality set 212b). Embodiments are not limited in this context.

Referring to FIG. 8A, process diagram 800a may begin with process 820a. At process 820a, the developer user 802 may utilize the scenario dashboard 804 to upload test scenarios and associated data and at process 820b the uploaded test scenarios and associated data may be committed at the code hosting platform 806 via the test automation portal. However, in many embodiments, the developer user 802 may upload test scenarios and associated data directly to the code hosting platform 806.

At process 820c, the code hosting platform 806 may publish the commit events. At process 820d, the subscription manager 810 may subscribe to the test commit events. Proceeding to process 820e, the subscription manager 810 may cause the test manager 812 to aggregate the test scenarios for onboarded components (e.g., component of the application to which the test is associated). As part of aggregating the test scenarios, at process 820f, the test manager 812 may read feature files from the feature folder in the corresponding automation repository on the code hosting platform 806. At process 820g, the test manager 812 may parse the features from the feature file and, at process 820h, cause the data manager 814 to update the database with scenario and story details.

Referring to FIG. 8B, process diagram 800b may begin with process 824a. At process 824a, the user 822 may access the scenario dashboard 816 to view the test scenarios and stories. At process 824b, the scenario dashboard 816 may read the scenarios from the data manager 814. In other words, user input provided via the scenario dashboard 816 may cause the data manager 814 to retrieve the test scenarios from the database and provide them for display via the scenario dashboard 816. For example, the data manager 814 may provide the test scenarios to the interface administrator 304. At process 824c, the test scenarios may be displayed at the scenario dashboard 816, such as by the interface administrator 304.

Figure 9:
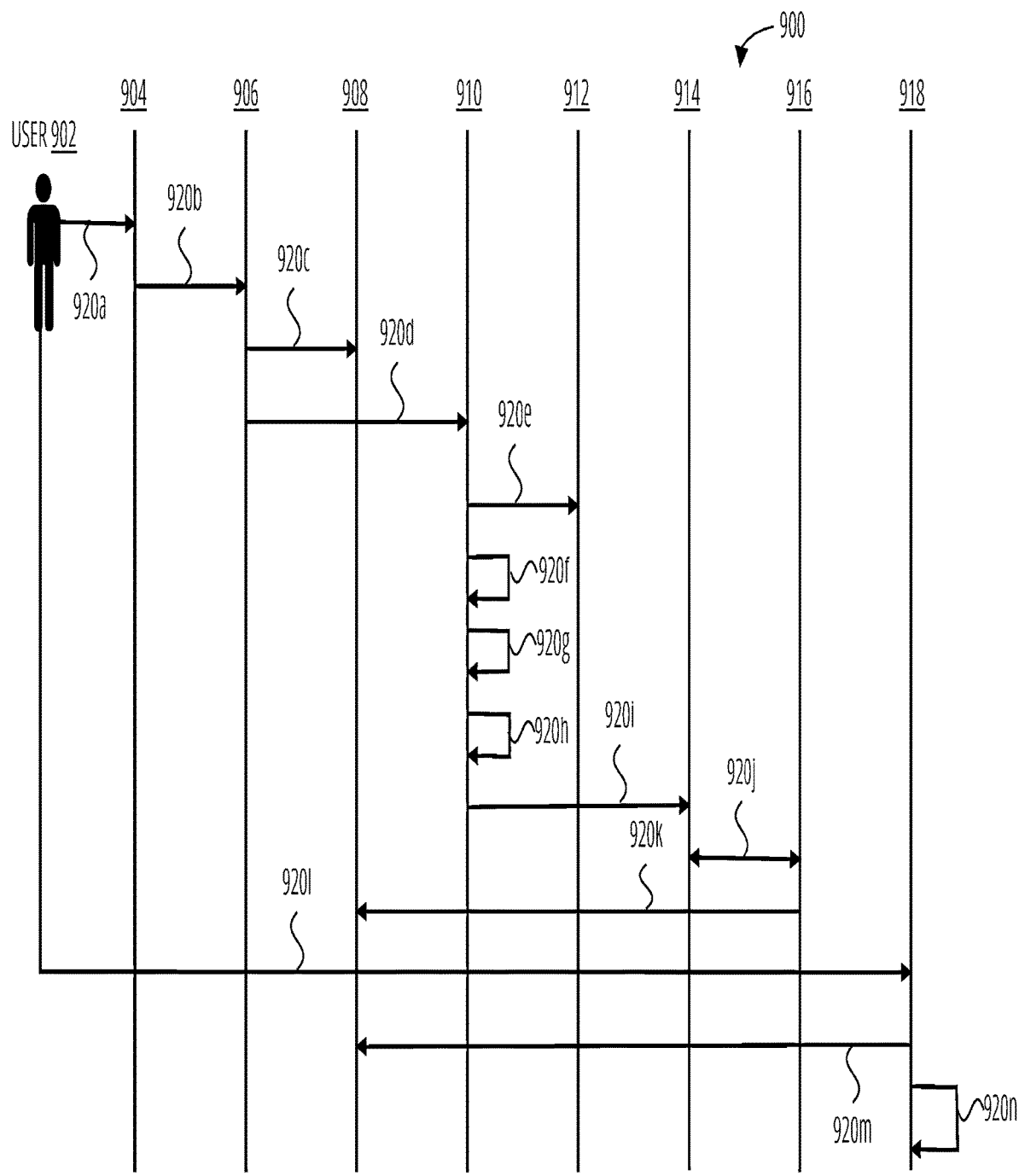
FIG. 9 illustrates an exemplary process diagram corresponding to test execution according to one or more embodiments.

FIG. 9 illustrates a process diagram 900 corresponding to test execution according to some embodiments. More specifically, process diagram 900 may correspond to operations associated with executing a BDD test via the test automation portal. Many of the operations of process diagram 900, such as those without direct interaction with user 902, are automatically performed by the test automation portal. The process diagram 900 may include various processes involving one or more of the user 902, a scenario dashboard 904, a test manager 906, a data manager 908, an automation server 910, a code hosting platform 912, an event streaming service 914, a subscription manager 916, and an execution dashboard 918. It will be appreciated that one or more components of FIG. 9 may be the same or similar to one or more other components disclosed hereby. For example, automation server 910 may be the same or similar to automation server 606. In another example, execution dashboard 918 may be the same or similar to test execution dashboard 308 or execution dashboard 628. Embodiments are not limited in this context.

At process 920a, the user 902 may select test scenarios and click to execute at the scenario dashboard 904. At process 920b, the selected test scenarios for execution may be indicated to the test manager 906. In response, at process 920c, an execution record may be created by the test manager 906 and stored in the database via the data manager 908 and, at process 920d, the test manager 906 may pass parameters to and cause the automation server 910 to initiate the test. The passed parameters may include one or more of the appropriate URL of the code hosting platform 608 (e.g., the URL of the automation repository), the scenario identifiers, tags, etcetera.

At process 920e, the automation server 910 may check out the automation repository at the code hosting platform 912. At process 920f, the automation server 910 may execute a Maven/Gradle test. At process 920g, the automation server 910 may generate and store a report. At process 920h, the automation server 910 may send an email to the user 902. At process 920i, the test execution metadata and the results events may be published to the event streaming service 914. At process 920j, the subscription manager 916 may detect the events (e.g., via a listener). At process 920k, the subscription manager 916 may cause the data manager 908 to update the database based on the test execution metadata and the results events. In various embodiments, the execution record may include a data structure for tracking test performance and results. Accordingly, in some embodiments, the execution record may be updated with the execution data and/or execution metadata based on the test execution metadata and the results events. For example, the execution record may be updated with results after performance of the test.

At process 920l, the user 902 may access the execution dashboard 918 to view the test execution details. At process 920m, the execution dashboard 918 may read the scenarios from the data manager 908. In other words, the user 902 accessing the execution dashboard 918 may cause the data manager 814 to retrieve the test execution metadata and results from the database and provide them for display via the execution dashboard 918. For example, the data manager 908 may provide the test execution metadata and results from the database to the interface administrator 304. At process 920n, the test execution metadata and results may be displayed at the execution dashboard 918, such as by the interface administrator 304.

Figure 10A:
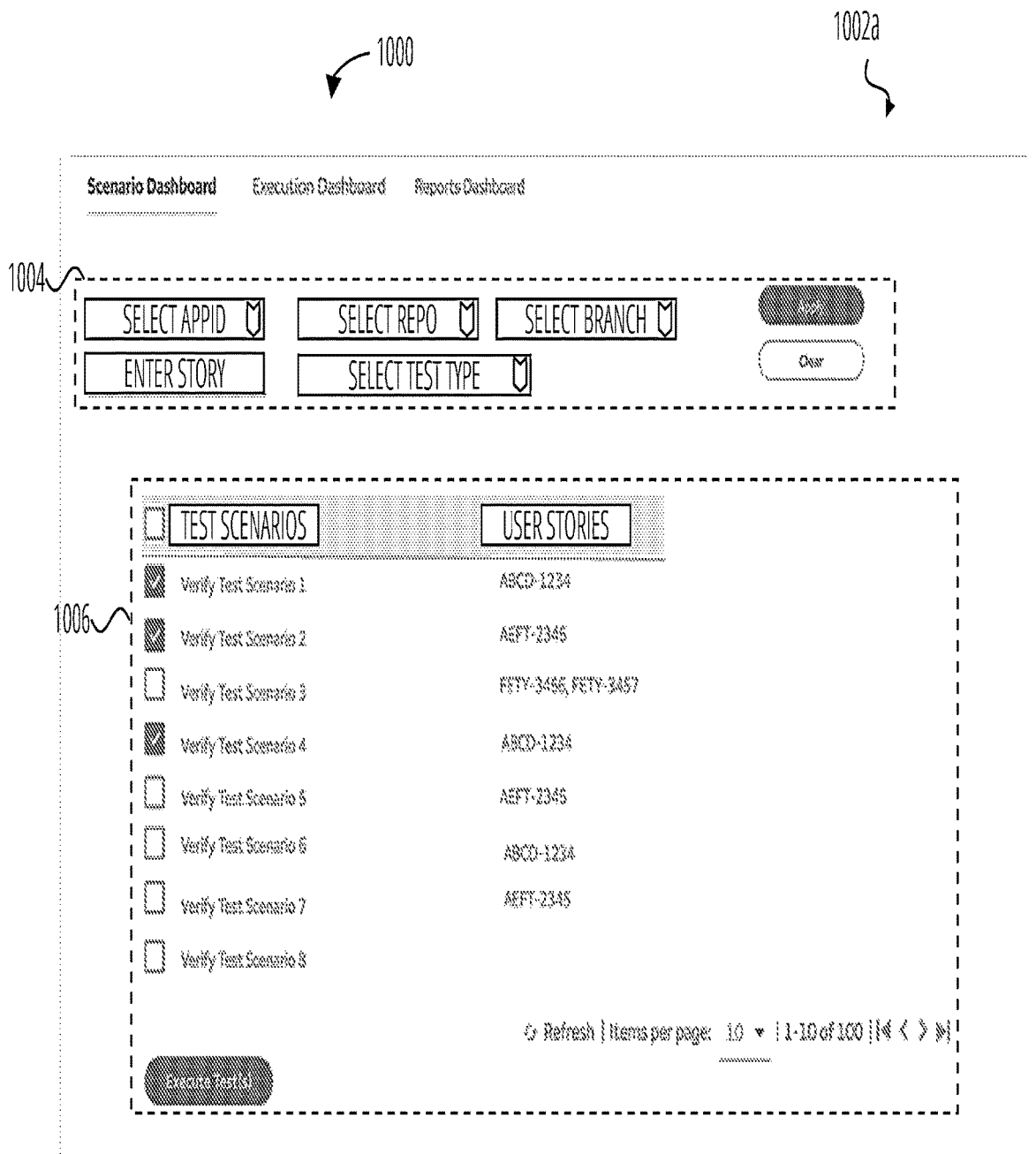
FIGS. 10A and 10B illustrate exemplary aspects of a scenario dashboard according to one or more embodiments.
Figure 10B:
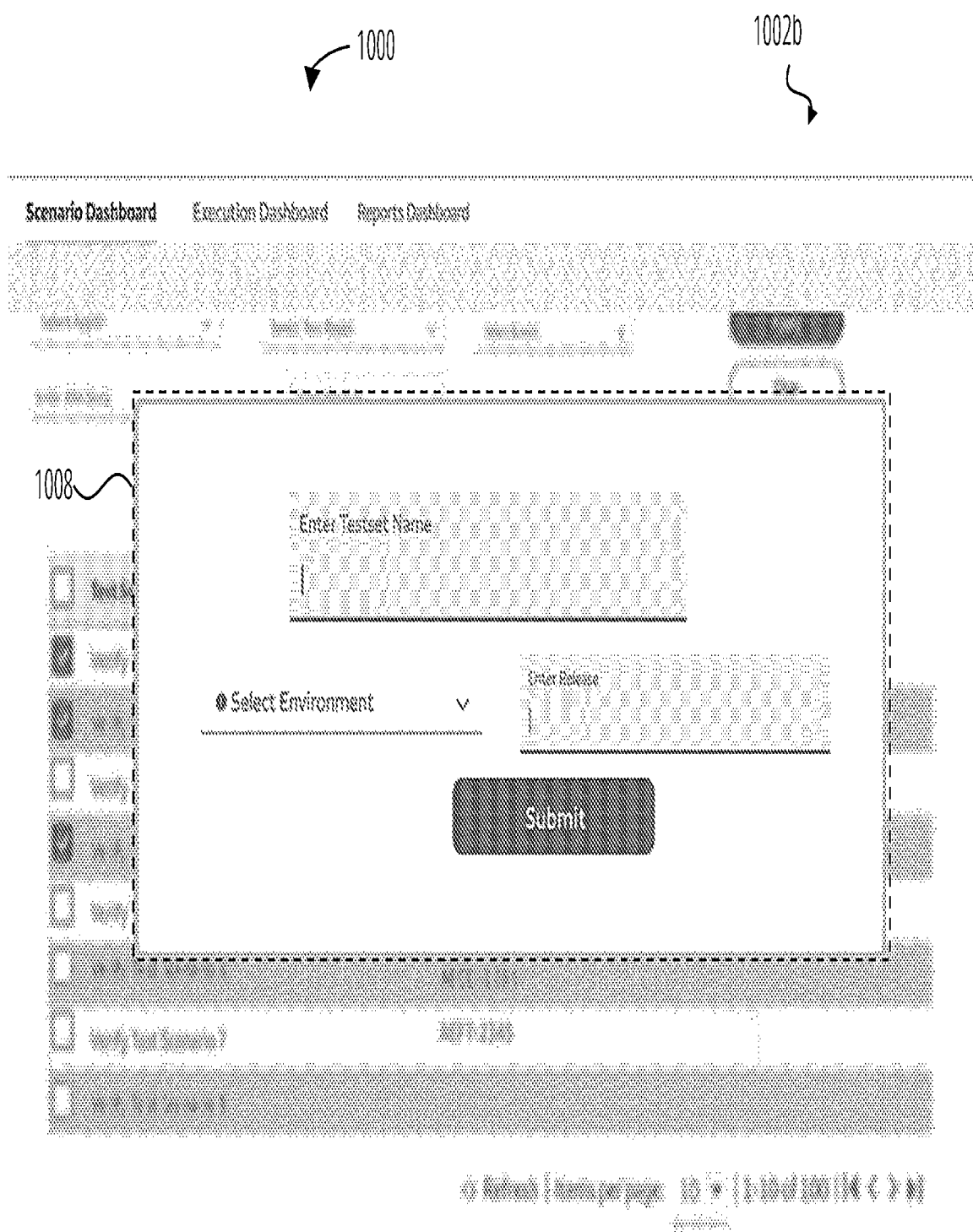

FIGS. 10A and 10B illustrate exemplary aspects of a scenario dashboard 1000 according to some embodiments. More specifically, FIG. 10A illustrates a first view 1002a of the scenario dashboard 1000 and FIG. 10B illustrates a second view 1002b of the scenario dashboard 1000. The scenario dashboard 1000 results in an improved user interface for electronic devices at least through the specific manners of providing (e.g., by displaying) the customized and intuitive experience to a user described below. For example, the scenario dashboard 1000 may provide a specific improvement over existing systems by automatically aggregating available test scenarios, displaying the test scenarios in a manner that allows selection and execution of one or more test scenarios, and displaying the available test scenarios in association with corresponding user stories. One or more test automation portals, or components thereof, may be utilized to realize the functionality described with respect to FIGS. 10A and 10B, such as onboarding manager 106, dashboard manager 108, test manager 110, data manager 112, subscription manager 114, and accessibility manager 116. It will be appreciated that one or more components of FIGS. 10A and 10B may be the same or similar to one or more other components disclosed hereby. For example, scenario dashboard 1000 may be the same or similar to scenario dashboard 306 or scenario dashboard 620. Embodiments are not limited in this context.

Referring to FIG. 10A, view 1002a of the scenario dashboard 1000 includes a filter dialogue box 1004 and a selection dialogue box 1006. The filter dialogue box 1004 may be used to filter available test scenarios to more relevant available test scenarios. In the illustrated embodiment, the filter dialogue box 1004 includes drop down menus to select application identifier (i.e., AppID), repository, branch of the repository, and test type. In various embodiments, the drop down menus are automatically populated by the interface administrator (e.g., interface administrator 304) based on prior selections. For example, after the AppID is selected, the drop down menu for repository selection may be populated with options, after the repository is selected, the drop down menu for branch selection may be populated, and so on. Further, in some embodiments, after each selection, the selection dialogue box 1006 may be updated with the matching available test scenarios. Additionally, selections may not be required for each drop down menu such that once the desired test scenarios are selected in the selection dialogue box 1006, the testing may be initiated regardless of which, if any, selections have been made in the filter dialogue box 1104. The test types may include a variety of test types associated with test scenarios, such as regression, BDD, smoke test, etcetera. Additionally, or alternatively, a user may enter the name of a user story and have all test scenarios associated with the user story be populated in the selection dialogue box 1006.

A user may select which test scenario(s) to perform via the selection dialogue box 1006. In the selection dialogue box 1006, the available test scenarios may be displayed in association with the corresponding user stories. In many embodiments, mapping the available test scenarios to corresponding user stories may enable users, such as non-developer users, to more readily identify the desired test scenario(s) to perform. Once the desired test scenario(s) are selected, a user may click "Execute Test(s)" to begin execution.

Referring to FIG. 10B, view 1002b of the scenario dashboard 1000 includes a search dialogue box 1008. A user may utilize the search dialogue box 1008 to search for a predefined set of tests, such as a set of tests previously executed. In the scenario dashboard 1000, a user may enter the name of the set of tests, select the environment, and/or enter the release. In various embodiments, the environment may include quality assurance, testing, development, user acceptance, and the like.

FIG. 11 illustrates exemplary aspects of an execution dashboard 1100 according to some embodiments. More specifically, FIG. 11 illustrates an exemplary view 1102 of the execution dashboard 1100. The execution dashboard 1100 results in an improved user interface for electronic devices at least through the specific manners of providing (e.g., by displaying) the customized and intuitive experience to a user described below. For example, the execution dashboard 1100 may provide a specific improvement over existing systems by providing test execution progress and/or results in real-time for historical and in-process BDD tests. One or more test automation portals, or components thereof, may be utilized to realize the functionality described with respect to FIG. 11, such as onboarding manager 106, dashboard manager 108, test manager 110, data manager 112, subscription manager 114, and accessibility manager 116. It will be appreciated that one or more components of FIG. 11 may be the same or similar to one or more other components disclosed hereby. For example, execution dashboard 1100 may be the same or similar to execution dashboard 308 or execution dashboard 918. Embodiments are not limited in this context.

View 1102 of the execution dashboard 1100 includes a filter dialogue box 1104, an execution overview 1106, and an execution tests view 1108. The filter dialogue box 1104 may include a plurality of drop down menus that operate in a similar manner as described with respect to the filter dialogue box 1004 of FIG. 10A. In the illustrated embodiment, the filter dialogue box 1104 includes drop down menus to select AppID, repo(s), branch, test type, environment, and test set. The execution overview 1106 may provide an overview of the execution of the one or more selected test scenarios (i.e., the selected test set). The execution tests view 1108 may provide details regarding each test in the selected test set. Additionally, a link may be provided to get more details on each test in the selected test set.

Figure 12:
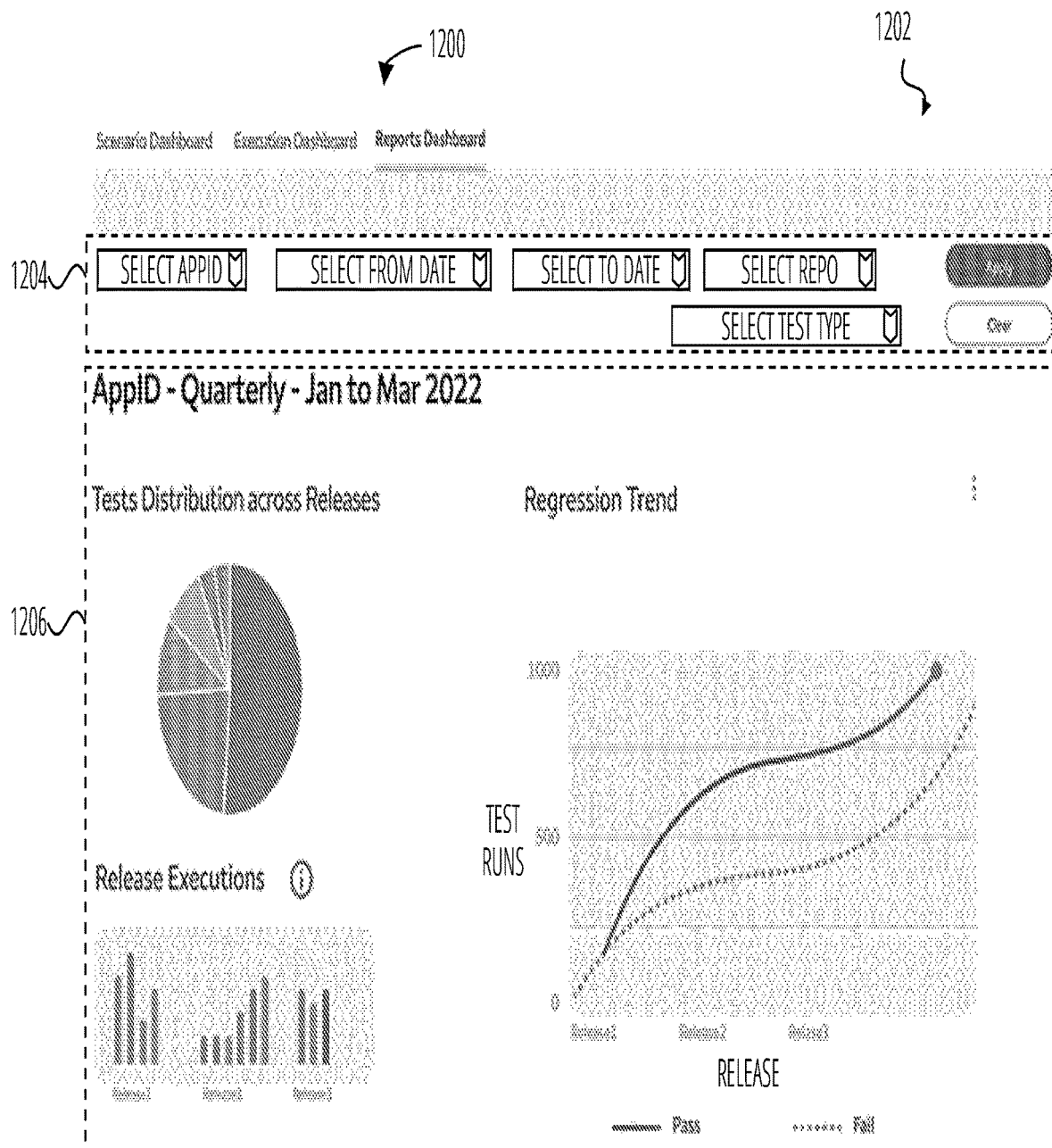
FIG. 12 illustrates an exemplary aspects of a reports dashboard according to one or more embodiments.

FIG. 12 illustrates exemplary aspects of a reports dashboard 1200 according to some embodiments. More specifically, FIG. 12 illustrates an exemplary view 1202 of the reports dashboard 1200. The reports dashboard 1200 results in an improved user interface for electronic devices at least through the specific manners of providing (e.g., by displaying) the customized and intuitive experience to a user described below. For example, the reports dashboard 1200 may provide a specific improvement over existing systems by providing testing overview of BDD software development projects, such as successful or failed tests over time and/or releases. One or more test automation portals, or components thereof, may be utilized to realize the functionality described with respect to FIG. 12, such as onboarding manager 106, dashboard manager 108, test manager 110, data manager 112, subscription manager 114, and accessibility manager 116. It will be appreciated that one or more components of FIG. 12 may be the same or similar to one or more other components disclosed hereby. For example, reports dashboard 1200 may be the same or similar to reports dashboard 310 or reports dashboard 630. Embodiments are not limited in this context.

View 1202 of the reports dashboard 1200 includes a filter dialogue box 1204 and a report 1206. The filter dialogue box 1204 may include a plurality of drop down menus that operate in a similar manner as described with respect to the filter dialogue box 1004 of FIG. 10A. In the illustrated embodiment, the filter dialogue box 1204 includes drop down menus to select AppID, start date, end date, repo, and test type. The report 1206 may be generated, including the pie chart and the graph, based on the options selected in the filter dialogue box 1204. In various embodiments, the reports dashboard 1200 can enable users to monitor, for every release, the total number of tests executed with pass fail trends over a period of time. In various such embodiments, users can change the selections (e.g., via filter dialogue box 1204) and compare the trends from the previous releases.

Figure 13:
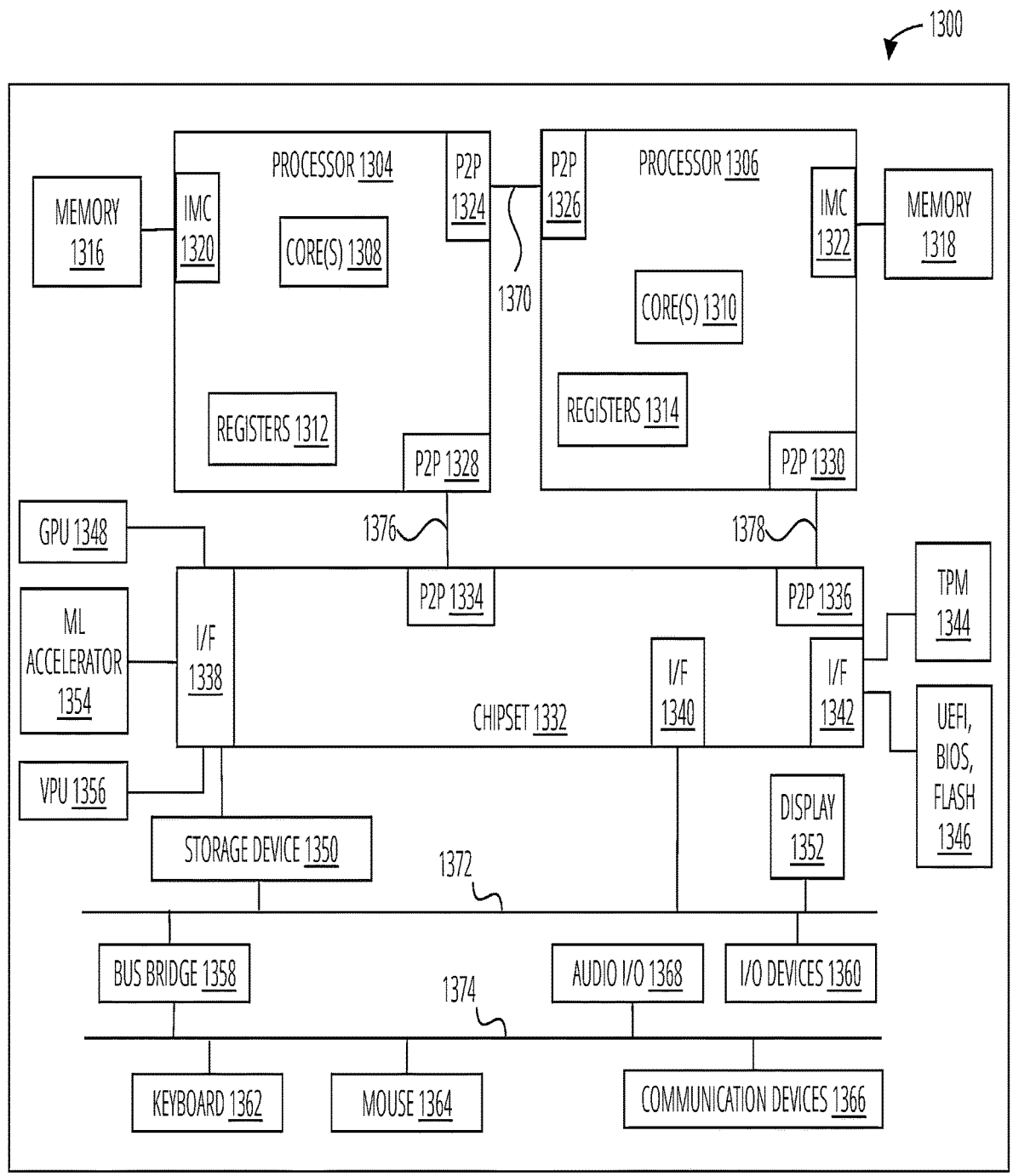
FIG. 13 illustrates exemplary aspects of a computing system according to one or more embodiments described hereby.

FIG. 13 illustrates an embodiment of a system 1300 that may be suitable for implementing various embodiments described hereby. System 1300 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, and the like. Further embodiments implement larger scale server configurations. In other embodiments, the system 1300 may have a single processor with one core or more than one processor. Note that the term "processor" refers to a processor with a single core or a processor package with multiple processor cores. In at least one embodiment, the computing system 600, or one or more components thereof, is representative of one or more components described hereby, such as test automation portal 102 or database 618. More generally, the computing system 1300 may be configured to implement embodiments including logic, systems, logic flows, methods, apparatuses, and functionality described hereby. The embodiments, however, are not limited to implementation by the system 1300.

As used in this application, the terms "system" and "component" and "module" are generally intended to refer to a computer-related entity, either hardware, a combination of hardware and software, software, or software in execution, examples of which are provided by the exemplary system 1300. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Although not necessarily illustrated, the computing system 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. Further, the computing system 1300 may include or implement various articles of manufacture. An article of manufacture may include a non-transitory computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, encrypted code, and the like, implemented using any suitable high-level, low-level, object-oriented, visual, compiled, and/or interpreted programming language. Embodiments may also be at least partly implemented as instructions contained in or on a non-transitory computer-readable medium, which may be read and executed by one or more processors to enable performance of the operations described herein.

As illustrated in FIG. 13, the system 1300 comprises a motherboard or system-on-chip (SoC) 1302 for mounting platform components. Motherboard or system-on-chip (SoC) 1302 is a point-to-point (P2P) interconnect platform that includes a first processor 1304 and a second processor 1306 coupled via a point-to-point interconnect 1370 such as an Ultra Path Interconnect (UPI). In other embodiments, the system 1300 may be of another bus architecture, such as a multi-drop bus. Furthermore, each of processor 1304 and processor 1306 may be processor packages with multiple processor cores including core(s) 1308 and core(s) 1310, respectively. While the system 1300 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 1304 and chipset 1332. Some platforms may include additional components and some platforms may only include sockets to mount the processors and/or the chipset. Furthermore, some platforms may not have sockets (e.g. SoC, or the like).

The processor 1304 and processor 1306 can be any of various commercially available processors. Dual microprocessors, multi-core processors, and other multi-processor architectures may also be employed as the processor 1304 and/or processor 1306. Additionally, the processor 1304 need not be identical to processor 1306.

Processor 1304 includes an integrated memory controller (IMC) 1320 and point-to-point (P2P) interface 1324 and P2P interface 1328. Similarly, the processor 1306 includes an IMC 1322 as well as P2P interface 1326 and P2P interface 1330. IMC 1320 and IMC 1322 couple the processors processor 1304 and processor 1306, respectively, to respective memories (e.g., memory 1316 and memory 1318). Memories 1316, 1318 can store instructions executable by circuitry of system 1300 (e.g., processor 1304, processor 1306, graphics processing unit (GPU) 1348, ML accelerator 1354, vision processing unit (VPU) 1356, or the like). For example, memories 1316, 1318 can store instructions for one or more of test automation portal 102, accessibility manager 204, dashboard manager 302, test manager 402, subscription manager 502, and the like. In another example, memories 1316, 1318 can store data, such as user experiences 208a, 208b, 208c, test scenarios, test results, user stories, execution records, test execution metadata, and the like. Memory 1316 and memory 1318 may be portions of the main memory (e.g., a dynamic random-access memory (DRAM)) for the platform such as double data rate type 3 (DDR3) or type 4 (DDR4) synchronous DRAM (SDRAM). In the present embodiment, the memory 1316 and memory 1318 locally attach to the respective processors (i.e., processor 1304 and processor 1306). In other embodiments, the main memory may couple with the processors via a bus and/or shared memory hub.

System 1300 includes chipset 1332 coupled to processor 1304 and processor 1306. Furthermore, chipset 1332 can be coupled to storage device 1350, for example, via an interface (I/F) 1338. The I/F 1338 may be, for example, a Peripheral Component Interconnect-enhanced (PCI-e). In many embodiments, storage device 1350 comprises a non-transitory computer-readable medium. Storage device 1350 can store instructions executable by circuitry of system 1300 (e.g., processor 1304, processor 1306, GPU 1348, ML accelerator 1354, vision processing unit 1356, or the like). For example, storage device 1350 can store instructions for one or more of test automation portal 102, accessibility manager 204, dashboard manager 302, test manager 402, subscription manager 502, and the like. In another example, storage device 1350 can store data, such as user experiences 208a, 208b, 208c, test scenarios, test results, user stories, execution records, test execution metadata, and the like. In some embodiments, instructions may be copied or moved from storage device 1350 to memory 1316 and/or memory 1318 for execution, such as by processor 1304 and/or processor 1306.

Processor 1304 couples to a chipset 1332 via P2P interface 1328 and P2P interface 1334 while processor 1306 couples to a chipset 1332 via P2P interface 1330 and P2P interface 1336. Direct media interface (DMI) 1376 and DMI 1378 may couple the P2P interface 1328 and the P2P interface 1334 and the P2P interface 1330 and P2P interface 1336, respectively. DMI 1376 and DMI 1378 may be a high-speed interconnect that facilitates, e.g., eight Giga Transfers per second (GT/s) such as DMI 3.0. In other embodiments, the components may interconnect via a bus.

The chipset 1332 may comprise a controller hub such as a platform controller hub (PCH). The chipset 1332 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1332 may comprise more than one controller hub such as a chipset with a memory controller hub, a graphics controller hub, and an input/output (I/O) controller hub.

In the depicted example, chipset 1332 couples with a trusted platform module (TPM) 1344 and UEFI, BIOS, FLASH circuitry 1346 via I/F 1342. The TPM 1344 is a dedicated microcontroller designed to secure hardware by integrating cryptographic keys into devices. The UEFI, BIOS, FLASH circuitry 1346 may provide pre-boot code.

Furthermore, chipset 1332 includes the I/F 1338 to couple chipset 1332 with a high-performance graphics engine, such as, graphics processing circuitry or a graphics processing unit (GPU) 1348. In other embodiments, the system 1300 may include a flexible display interface (FDI) (not shown) between the processor 1304 and/or the processor 1306 and the chipset 1332. The FDI interconnects a graphics processor core in one or more of processor 1304 and/or processor 1306 with the chipset 1332.

Additionally, ML accelerator 1354 and/or vision processing unit 1356 can be coupled to chipset 1332 via I/F 1338. ML accelerator 1354 can be circuitry arranged to execute ML related operations (e.g., training, inference, etc.) for ML models. Likewise, vision processing unit 1356 can be circuitry arranged to execute vision processing specific or related operations. In particular, ML accelerator 1354 and/or vision processing unit 1356 can be arranged to execute mathematical operations and/or operands useful for machine learning, neural network processing, artificial intelligence, vision processing, etc.

Various I/O devices 1360 and display 1352 couple to the bus 1372, along with a bus bridge 1358 which couples the bus 1372 to a second bus 1374 and an I/F 1340 that connects the bus 1372 with the chipset 1332. In one embodiment, the second bus 1374 may be a low pin count (LPC) bus. Various I/O devices may couple to the second bus 1374 including, for example, a keyboard 1362, a mouse 1364, and communication devices 1366.

Furthermore, an audio I/O 1368 may couple to second bus 1374. Many of the I/O devices 1360 and communication devices 1366 may reside on the motherboard or system-on-chip (SoC) 1302 while the keyboard 1362 and the mouse 1364 may be add-on peripherals. In other embodiments, some or all the I/O devices 1360 and communication devices 1366 are add-on peripherals and do not reside on the motherboard or system-on-chip (SoC) 1302. More generally, the I/O devices of system 1300 may include one or more of microphones, speakers, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, displays, augmented/virtual reality devices, printers, actuators, motors, transducers, and the like.

Figure 14:
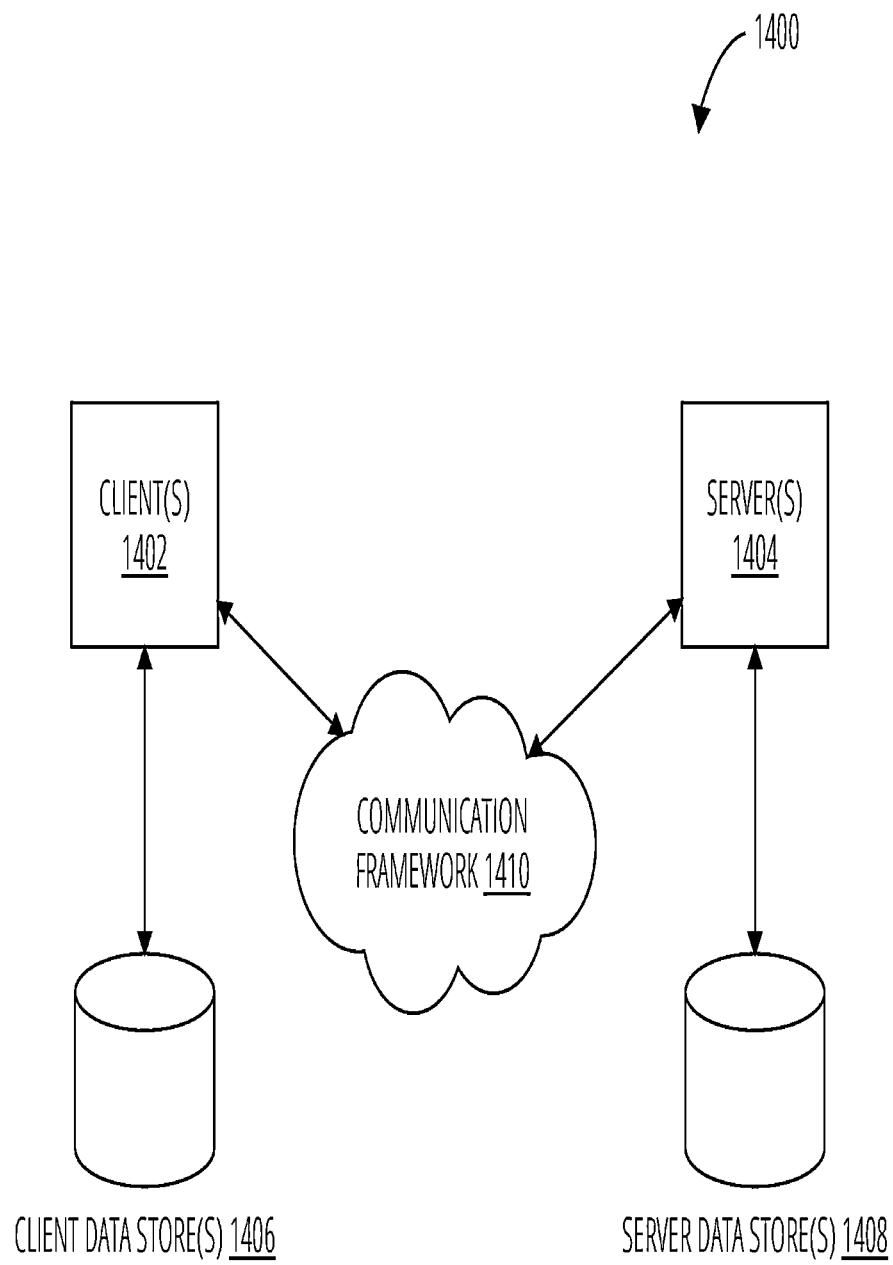
FIG. 14 illustrates exemplary aspects of a communications architecture according to one or more embodiments described hereby.

FIG. 14 is a block diagram depicting an exemplary communications architecture 1400 suitable for implementing various embodiments as previously described, such as communications between user 104 and test automation portal 102 and/or test automation portal 602 and automation server 606. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 includes one or more client(s) 1402 and server(s) 1404. In some embodiments, each client 1402 and/or server 1404 may include a computing system (e.g., system 1300) The server(s) 1404 may implement one or more devices of test automation portal 602. The client(s) 1402 and the server(s) 1404 are operatively connected to one or more respective client data store(s) 1406 and server data store(s) 1408 that can be employed to store information local to the respective client(s) 1402 and server(s) 1404, such as cookies and/or associated contextual information. In various embodiments, any one of server(s) 1404 may implement one or more logic flows or operations described hereby, such as in conjunction with storage of data received from any one of client(s) 1402 on any of server data store(s) 1408. In one or more embodiments, one or more of client data store(s) 1406 or server data store(s) 1408 may include memory accessible to one or more portions of components, applications, and/or techniques described hereby.

The client(s) 1402 and the server(s) 1404 may communicate information between each other using a communication framework 1410. The communication framework 1410 may implement any well-known communications techniques and protocols. The communication framework 1410 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1410 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 1402 and the server(s) 1404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate.

The various devices, components, modules, features, and functionalities described hereby may include, or be implemented via, various hardware elements, software elements, or a combination of both. Examples of hardware elements may include devices, logic devices, hardware components, processors, microprocessors, circuits, circuitry, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, algorithms, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation. It is noted that hardware, firmware, and/or software elements may be collectively or individually referred to herein as "logic", "circuit", or "circuitry".

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, and the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, and the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, and the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

There are a number of example embodiments described herein.

Example 1 is a computer-implemented method, comprising: detecting a commit event at a code hosting platform, the commit event corresponding to updates at the code hosting platform associated with behavioral-driven development (BDD) testing of a software application component; retrieving, from the code hosting platform and in response to identification of the commit event, a feature file corresponding to the commit event; parsing the feature file based on a set of onboarded scenarios stored in a database to identify details associated with a set of one or more new or modified scenarios associated with the software application component; updating the set of onboarded scenarios with the details associated with the set of one or more new or modified scenarios to produce an updated set of scenarios; presenting indications of the set of updated scenarios in a scenario dashboard in response to user input accessing the scenario dashboard; identifying a set of selected scenarios for testing in response to user input selecting one or more of the set of updated scenarios for testing; determining, automatically, a corresponding repository and corresponding test information for each scenario in the set of selected scenarios; and utilizing the corresponding repository and corresponding test information for each scenario in the set of selected scenarios to cause an automation server to perform BDD testing on the software application component for the set of selected scenarios.

Example 2 is the computer-implemented method of Example 1 that may optionally include generating an execution record corresponding to the set of selected scenarios in response to identification of the set of selected scenarios for testing; and storing the execution record in the database.

Example 3 is the computer-implemented method of Example 2 that may optionally include updating the execution record based on results of performance of the BDD testing on the software application component for the set of selected scenarios.

Example 4 is the computer-implemented method of Example 3 that may optionally include generating a report summarizing the results of performance of the BDD testing on the software application component for the set of selected scenarios based on the execution record.

Example 5 is the computer-implemented method of Example 1 that may optionally include detecting a test execution event at the automation server, the test execution event corresponding to performance of the BDD testing on the software application component; and determining test execution data or test execution metadata in response to the test execution event; and storing the test execution data or test execution metadata in the database.

Example 6 is the computer-implemented method of Example 1 that may optionally include onboarding a new scenario into the set of onboarded scenarios based on input received from a first type of user, wherein a corresponding repository and corresponding test information of the new scenario are provided as part of the onboarding.

Example 7 is the computer-implemented method of Example 6 that may optionally include providing a first user experience to the first type of user and a second user experience to a second type of user, wherein the first user experience is associated with a first set of permissions and the second user experience is associated with a second set of permissions, and wherein the second set of permissions exclude an ability to onboard new scenarios.

Example 8 is the computer-implemented method of Example 7 that may optionally include that the first type of user comprises a developer and the second type of user comprises a business user.

Example 9 is the computer-implemented method of Example 1 that may optionally include that the commit event at the code hosting platform is detected via a listener that is subscribed to a topic on an event streaming service that the code hosting platform uses to publish commit events.

Example 10 is an apparatus comprising a processor and a memory storing instructions that, when executed by the processor, cause the processor to perform the computer-implemented method of any of Examples 1 to 9.

Example 11 is a non-transitory machine-readable medium storing computer-executable program code instructions that, when executed by a computing apparatus, cause the computing apparatus to perform the computer-implemented method of any of Examples 1 to 9.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   detecting a commit event at a code hosting platform, the commit event corresponding to updates at the code hosting platform associated with behavioral-driven development (BDD) testing of a software application component;
   retrieving, from the code hosting platform and in response to identification of the commit event, a feature file corresponding to the commit event;
   parsing the feature file based on a set of onboarded scenarios stored in a database to identify details associated with a set of one or more new or modified scenarios associated with the software application component;
   updating the set of onboarded scenarios with the details associated with the set of one or more new or modified scenarios to produce an updated set of scenarios;
   presenting indications of the set of updated scenarios in a scenario dashboard in response to user input accessing the scenario dashboard;
   identifying a set of selected scenarios for testing in response to user input selecting one or more of the set of updated scenarios for testing;
   determining, automatically, a corresponding repository and corresponding test information for each scenario in the set of selected scenarios; and
   utilizing the corresponding repository and corresponding test information for each scenario in the set of selected scenarios to cause an automation server to perform BDD testing on the software application component for the set of selected scenarios.

2. The computer-implemented method of claim 1, comprising:
   generating an execution record corresponding to the set of selected scenarios in response to identification of the set of selected scenarios for testing; and
   storing the execution record in the database.

3. The computer-implemented method of claim 2, comprising updating the execution record based on results of performance of the BDD testing on the software application component for the set of selected scenarios.

4. The computer-implemented method of claim 3, comprising generating a report summarizing the results of performance of the BDD testing on the software application component for the set of selected scenarios based on the execution record.

5. The computer-implemented method of claim 1, comprising:
   detecting a test execution event at the automation server, the test execution event corresponding to performance of the BDD testing on the software application component; and
   determining test execution data or test execution metadata in response to the test execution event; and
   storing the test execution data or test execution metadata in the database.

6. The computer-implemented method of claim 1, comprising onboarding a new scenario into the set of onboarded scenarios based on input received from a first type of user, wherein a corresponding repository and corresponding test information of the new scenario are provided as part of the onboarding.

7. The computer-implemented method of claim 6, comprising providing a first user experience to the first type of user and a second user experience to a second type of user, wherein the first user experience is associated with a first set of permissions and the second user experience is associated with a second set of permissions, and wherein the second set of permissions exclude an ability to onboard new scenarios.

8. The computer-implemented method of claim 7, wherein the first type of user comprises a developer and the second type of user comprises a business user.

9. The computer-implemented method of claim 1, wherein the commit event at the code hosting platform is detected via a listener that is subscribed to a topic on an event streaming service that the code hosting platform uses to publish commit events.

10. An apparatus comprising:
    a processor; and
    memory storing instructions that, when executed by the processor, cause the processor to:
      detect a commit event at a code hosting platform, the commit event corresponding to updates at the code hosting platform associated with behavioral-driven development (BDD) testing of a software application component;
      retrieve, from the code hosting platform and in response to identification of the commit event, a feature file corresponding to the commit event;
      parse the feature file based on a set of onboarded scenarios stored in a database to identify a set of new or modified scenarios associated with the software application component;
      update the set of onboarded scenarios with the set of new or modified scenarios to produce an updated set of scenarios;
      present the set of updated scenarios in a scenario dashboard in response to user input accessing the scenario dashboard;
      identify a set of selected scenarios for testing in response to user input selecting one or more of the set of updated scenarios for testing;
      determine, automatically, a corresponding repository and corresponding test information for each scenario in the set of selected scenarios; and utilize the corresponding repository and corresponding test information for each scenario in the set of selected scenarios to cause an automation server to perform BDD testing on the software application component for the set of selected scenarios.

11. The apparatus of claim 10, wherein the memory further stores instructions that, when executed by the processor, cause the processor to:
generate an execution record corresponding to the set of selected scenarios in response to identification of the set of selected scenarios for testing; and
store the execution record in the database.

12. The apparatus of claim 11, wherein the memory further stores instructions that, when executed by the processor, cause the processor to update the execution record based on results of performance of the BDD testing on the software application component for the set of selected scenarios.

13. The apparatus of claim 12, wherein the memory further stores instructions that, when executed by the processor, cause the processor to generate a report summarizing the results of performance of the BDD testing on the software application component for the set of selected scenarios based on the execution record.

14. The apparatus of claim 10, wherein the memory further stores instructions that, when executed by the processor, cause the processor to:
detect a test execution event at the automation server, the test execution event corresponding to performance of the BDD testing on the software application component; and
determine test execution data or test execution metadata in response to the test execution event; and
store the test execution data or test execution metadata in the database.

15. The apparatus of claim 10, wherein the memory further stores instructions that, when executed by the processor, cause the processor to onboard a new scenario into the set of onboarded scenarios based on input received from a first type of user, wherein a corresponding repository and corresponding test information of the new scenario are provided as part of the onboarding.

16. At least one non-transitory computer-readable storage medium storing computer-executable program code instructions that, when executed by a computing apparatus, cause the computing apparatus to:
detect a commit event at a code hosting platform, the commit event corresponding to updates at the code hosting platform associated with behavioral-driven development (BDD) testing of a software application component;
retrieve, from the code hosting platform and in response to identification of the commit event, a feature file corresponding to the commit event;
parse the feature file based on a set of onboarded scenarios stored in a database to identify a set of new or modified scenarios associated with the software application component;
update the set of onboarded scenarios with the set of new or modified scenarios to produce an updated set of scenarios;
present the set of updated scenarios in a scenario dashboard in response to user input accessing the scenario dashboard;
identify a set of selected scenarios for testing in response to user input selecting one or more of the set of updated scenarios for testing;
determine, automatically, a corresponding repository and corresponding test information for each scenario in the set of selected scenarios; and
utilize the corresponding repository and corresponding test information for each scenario in the set of selected scenarios to cause an automation server to perform BDD testing on the software application component for the set of selected scenarios.

17. The at least one non-transitory computer-readable storage medium of claim 16, wherein the computer-executable program code instructions, when executed by the computing apparatus, further cause the computing apparatus to:
generate an execution record corresponding to the set of selected scenarios in response to identification of the set of selected scenarios for testing; and
store the execution record in the database.

18. The at least one non-transitory computer-readable storage medium of claim 17, wherein the computer-executable program code instructions, when executed by the computing apparatus, further cause the computing apparatus to update the execution record based on results of performance of the BDD testing on the software application component for the set of selected scenarios.

19. The at least one non-transitory computer-readable storage medium of claim 18, wherein the computer-executable program code instructions, when executed by the computing apparatus, further cause the computing apparatus to generate a report summarizing the results of performance of the BDD testing on the software application component for the set of selected scenarios based on the execution record.

20. The at least one non-transitory computer-readable storage medium of claim 16, wherein the computer-executable program code instructions, when executed by the computing apparatus, further cause the computing apparatus to:
detect a test execution event at the automation server, the test execution event corresponding to performance of the BDD testing on the software application component; and
determine test execution data or test execution metadata in response to the test execution event; and
store the test execution data or test execution metadata in the database.

* * * * *